United States Patent
Robles et al.

(10) Patent No.: US 11,679,290 B2
(45) Date of Patent: Jun. 20, 2023

(54) LIQUID CONCENTRATE FIRE RETARDANT COMPOSITIONS CONTAINING MIXTURES OF AMMONIUM PHOSPHATES

(71) Applicant: Perimeter Solutions LP, Clayton, MO (US)

(72) Inventors: Juan Robles, Highland, CA (US); Marcela Munoz, Fontana, CA (US); Melissa Kim, Alta Loma, CA (US)

(73) Assignee: Perimeter Solutions LP, Clayton, MO (US)

( * ) Notice: Subject to any disclaimer, the term of this patent is extended or adjusted under 35 U.S.C. 154(b) by 442 days.

(21) Appl. No.: 16/784,913

(22) Filed: Feb. 7, 2020

(65) Prior Publication Data

US 2020/0254290 A1    Aug. 13, 2020

Related U.S. Application Data

(60) Provisional application No. 62/802,902, filed on Feb. 8, 2019.

(51) Int. Cl.
| | | |
|---|---|---|
| A62D 1/00 | (2006.01) | |
| A62C 3/02 | (2006.01) | |
| C09K 21/04 | (2006.01) | |

(52) U.S. Cl.
CPC ............ *A62D 1/005* (2013.01); *A62C 3/0292* (2013.01); *C09K 21/04* (2013.01)

(58) Field of Classification Search
CPC ....... A62D 1/005; A62C 3/0292; C09K 21/04
See application file for complete search history.

(56) References Cited

U.S. PATENT DOCUMENTS

| | | |
|---|---|---|
| 3,334,045 A | 8/1967 | Nelson |
| 3,730,890 A | 5/1973 | Nelson et al. |
| 4,983,326 A | 1/1991 | Vandersall |
| 5,439,968 A | 8/1995 | Hyche |
| 6,395,200 B2 * | 5/2002 | Crouch ................ A62D 1/0035 252/601 |
| 6,620,348 B1 | 9/2003 | Vandersall et al. |
| 6,780,991 B2 * | 8/2004 | Vandersall ........... A62D 1/0035 106/18.32 |
| 8,202,449 B2 | 6/2012 | Garner et al. |
| 8,409,478 B2 | 4/2013 | Mans Fibla et al. |
| 2015/0368561 A1 | 12/2015 | Garner et al. |
| 2018/0037998 A1 * | 2/2018 | Khosla .................. C23F 11/167 |

FOREIGN PATENT DOCUMENTS

| | | |
|---|---|---|
| CL | 2019-00322 | 8/2019 |
| WO | 2014/121398 A1 | 8/2014 |
| WO | 2017005546 A1 | 1/2017 |
| WO | 2018/119523 A1 | 7/2018 |

OTHER PUBLICATIONS

International Search Report and Written Opinion, PCT/US2020/017326, dated Jun. 4, 2020, 15 pages.
US Department of Agriculture Forest Service "Long-Term Retardant, Wildland Firefighting," Jan. 7, 2020, Specification 5100-304d, 32 pages.
Active Minerals International LLC: "Min-U-Gel 400", May 1, 2014 (1 page).

* cited by examiner

*Primary Examiner* — Andrew J. Oyer
(74) *Attorney, Agent, or Firm* — Harness, Dickey & Pierce, P.L.C.

(57) ABSTRACT

Described herein are liquid fire retardant concentrate compositions comprising mixtures of ammonium phosphate fire retardants. Specifically, liquid fire retardant concentrate compositions comprising one or more of monoammonium phosphate (MAP), diammonium phosphate (DAP), and ammonium polyphosphate (APP) are described herein. The ammonium phosphate fire retardant(s) is typically suspended and/or dissolved in a liquid, typically with the fire retardant(s) incorporated into the composition in powder, or granular form. In certain aspects of the present invention, the compositions provided may exhibit one or more advantages as compared to current liquid concentrate fire retardants, including enhanced strength (i.e., a higher proportion of fire retardant component per unit volume), reduced toxicity, and/or reduced corrosion.

37 Claims, No Drawings

LIQUID CONCENTRATE FIRE RETARDANT COMPOSITIONS CONTAINING MIXTURES OF AMMONIUM PHOSPHATES

CROSS REFERENCE TO RELATED APPLICATIONS

This application claims priority to and the benefit of U.S. Provisional Patent Application Ser. No. 62/802,902, filed Feb. 8, 2019, which is incorporated herein by reference in its entirety for all relevant purposes.

FIELD OF THE INVENTION

Described herein are liquid fire retardant concentrate compositions comprising mixtures of ammonium phosphate fire retardants. Specifically, liquid fire retardant concentrate compositions comprising one or more of monoammonium phosphate (MAP), diammonium phosphate (DAP), and ammonium polyphosphate (APP) are described herein. The ammonium phosphate fire retardant(s) is typically suspended and/or dissolved in a liquid, typically with the fire retardant(s) incorporated into the composition in powder, or granular form. In certain aspects of the present invention, the compositions provided may exhibit one or more advantages as compared to current liquid concentrate fire retardants, including enhanced strength (i.e., a higher proportion of fire retardant component per unit volume), reduced toxicity, and/or reduced corrosion.

BACKGROUND OF THE INVENTION

Aerial application of fire retardant compositions to combat the spread of wildland fires is common. Generally, the fire retardant composition applied to combat the spread of wildland fires is in the form of a diluted, end-use solution. This end-use solution is generally prepared from a concentrated fire retardant composition, which may take the form of a powder or be a liquid-based suspension or slurry. Although each type of concentrate has proven suitable to form the end-use solution, in certain instances liquid concentrates may be preferred. For example, liquid concentrates can be simply and easily diluted to end-use strength with little mixing hardware and manpower. Also, liquid concentrates may be preferred for use in those installations where the storage and mixing equipment for handling liquid concentrates is already in place.

Since wildland fire retardants are most frequently transported to the fire and applied aerially, it is imperative that corrosive damage to the materials of construction of fixed-wing aircraft and helicopters be minimized. Thus, the corrosion caused by fire retardant solutions prepared from liquid fire retardant concentrates is an important feature.

Accordingly, the United States Department of Agriculture ("USDA") Forest Service has established, in Specification 5100-304d (Jan. 7, 2020, and any and all Amendments) entitled "Specification 5100-304d Long-Term Retardant, Wildland Firefighting" (hereinafter, "Forest Service Specification"), hereby incorporated by reference in its entirety for all relevant purposes, maximum allowable corrosion rates for 2024T3 aluminum, 4130 steel, yellow brass and Az-31-B magnesium. For example, the corrosivity of forest fire retardants, in concentrate, to aluminum, steel, yellow brass and magnesium must not exceed 5.0 milli-inches ("mils") per year ("mpy") as determined by the 90-day weight loss test listed in Table 3 of the above-referenced Forest Service Specification. The Forest Service Specification identifies the maximum amount of corrosion acceptable when both the retardant concentrate and its diluted solutions are exposed to each metal indicated above at temperatures of 70.degree. Fahrenheit ("° F.") and 120° F. in both the totally and partially immersed configuration. The maximum allowable corrosivity of aerially applied fire retardant diluted solutions to aluminum is 2.0 mpy, and the maximum corrosivity to brass and steel is 5.0 mpy when totally immersed or partially immersed. If the product is applied from fixed-tank equipped helicopters, the corrosivity of the fire retardants to magnesium must not exceed 4.0 mpy.

Another important feature of fire retardant solutions is toxicity, in particular toxicity to aquatic organisms.

There are various known fire retardant concentrates, both powder and liquid-based, that have proven effective in terms of fire retardant effect and also corrosion and toxicity.

Such concentrated liquid fire retardants include those containing ammonium polyphosphate. However, alternative fire retardant compositions are desired to provide more options for users combating wildland fires.

A need exists therefore for alternative liquid fire retardant concentrate compositions. One aspect for investigation is the fire retardant component, which can include MAP, DAP, and/or APP. he present invention provides liquid fire retardant concentrate compositions that are suitable in terms of effectiveness, corrosion, and toxicity like current compositions, including MAP and DAP-containing liquid fire retardant concentrate composition that meet such criteria and also provide advantages attendant to the presence of MAP and DAP in the concentrate.

BRIEF SUMMARY OF THE INVENTION

Provided herein are liquid fire-retardant concentrate compositions comprising a mixture of ammonium phosphates, the mixture comprising monoammonium phosphate (MAP) and diammonium phosphate (DAP) and a suspending agent comprising micronized clay. Also provided herein are liquid fire retardant concentrate compositions comprising one or more powdered fire retardants selected from MAP, DAP, and/or APP dispersed throughout an aqueous medium with the composition further comprising a suspending agent comprising micronized clay.

Also provided herein are liquid fire retardant concentrate compositions comprising a mixture of ammonium phosphates, the mixture comprising monoammonium phosphate (MAP) and diammonium phosphate (DAP) and wherein the fire-retardant component contains a low sulfate content (e.g., less than 0.2% by total weight) and/or does not include a sulfate source (e.g., diammonium sulfate).

Further provided are liquid fire-retardant concentrate compositions comprising a mixture of ammonium phosphates, the mixture comprising monoammonium phosphate (MAP) and diammonium phosphate (DAP), a biopolymer and water, wherein water constitutes less than 50% by volume of the concentrate composition.

Also provided are fire liquid fire retardant concentrate compositions comprising a mixture of ammonium phosphates, wherein the mixture comprises monoammonium phosphate (MAP) and free diammonium phosphate (DAP), a corrosion inhibitor system comprising micronized clay complexed with diammonium phosphate (complexed DAP) and water.

Also provided are methods of preparing the liquid fire-retardant concentrates described herein, the methods comprising dissolving monoammonium phosphate and diammonium phosphate in water and then adding a suspending agent. In some embodiments, a biopolymer and/or other components are subsequently added.

Provided herein are fire-retardant solutions prepared by the method of mixing a fire-retardant concentrate composition disclosed herein with water.

Provided herein are methods of producing a fire-retardant solution. In some embodiments, the method comprises mixing at least five volumes of water per one volume of liquid concentrate. In certain embodiments, the method comprises mixing three to seven volumes of water per volume of liquid concentrate.

Provided herein are methods of combatting a wildfire comprising applying a fire-retardant solution disclosed herein directly onto flaming fuel or indirectly on the fuel ahead of a potentially advancing fire front. In certain embodiments, the fire-retardant solution is applied from a ground platform, an aerial platform, or from both. In certain embodiments, the fire-retardant solution is applied from a rotary wing aircraft. In certain embodiments, the fire-retardant solution is applied from a device consisting of a helicopter bucket, an internal tank, or a tank directly attached to the exterior of the delivery platform.

Other objects and features will be in part apparent and in part pointed out hereinafter.

Definitions

It is to be noted that the term "a" or "an" entity refers to one or more of that entity; for example, "a plant," is understood to represent one or more plants. As such, the terms "a" (or "an"), "one or more," and "at least one" can be used interchangeably herein.

Furthermore, "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

Unless defined otherwise, technical and scientific terms used herein have the same meaning as commonly understood by one of ordinary skill in the art to which this disclosure is related.

Numeric ranges are inclusive of the numbers defining the range.

The headings provided herein are solely for ease of reference and are not limitations of the various aspects or aspects of the disclosure, which can be had by reference to the specification as a whole. Accordingly, the terms defined immediately below are more fully defined by reference to the specification in its entirety.

As used herein, the terms "concentrate," "retardant concentrate," and "fire retardant concentrate" can be used interchangeably to mean a concentrated product that is mixed with water to prepare a fire retardant solution prior to application. In particular as used herein to define the present invention, notably the appended claims, the term "fire retardant concentrate" refers to a liquid-containing concentrate diluted prior to use. That is, although "concentrate" may be used herein and in the art to define powder-based compositions, when defining the present invention the term "concentrate" refers to a composition that includes water (i.e., is not a powder).

As used herein, unless otherwise specified, the terms percent, %, or weight percent refer to a 'weight percent" of a certain component relative to the total weight of the total composition.

As used herein, the phrase "fire retardant solution" includes suspensions of soluble and insoluble components.

As used herein, the phrase "corrosion inhibitor system" means a component or mixture of components that reduce the corrosion of fire-retardant concentrates and solutions. In certain embodiments, a corrosion inhibitor system reduces the corrosion of fire-retardant concentrates and solutions to within some or all of the requirements of paragraphs 4.4.1 and 4.4.22 referenced in the U.S.D.A. Forest Service Specification 5100-304d, (Jan. 7, 2020, and any and all Amendments) referenced above and incorporated by reference herein for all relevant purposes.

As used herein, the term "free flowing" means that the substance will easily flow from or can be sucked from a container via a source of vacuum.

As used herein, the "corrosion rate" of a fire-retardant concentrate or fire-retardant solution expressed in milliinches per year (MPY) with respect to a metal is determined by the methods described in Forest Service Specification 5100-304d (Jan. 7, 2020, and any and all Amendments).

As used herein, the qualifier "ammoniacal," placed in front of nitrogen (i.e., "ammoniacal nitrogen"), when referring to the nitrogen to phosphorus molar ratio (N/P) specifies that the amount of nitrogen used to determine the N/P ratio is only that nitrogen present in the ammonium phosphate, and thus, if other nitrogen is present in the fire-retardant concentrate from other sources, this other nitrogen would not be considered when calculating the N/P ratio.

As used herein, a "fugitive color" is as defined in Section 6 of U.S.D.A Forest Service specification 5100-304d, January 2020, as follows: "A coloring agent which imparts a high degree of visibility to the mixed product when first applied to wildland fuels but will gradually disappear over several months." In certain aspects, the dye color intensity is negatively impacted by the ultraviolet intensity of natural sunshine.

As used herein, a "dye" is a coloring material used in solution for staining other materials and a "pigment" is a colored solid powder that is mixed with other materials to alter their color.

DETAILED DESCRIPTION OF THE INVENTION

In accordance with the present invention, described herein are liquid fire retardant concentrate compositions comprising one or more retardants, including MAP, DAP, and/or APP. First, as compared to powder compositions, the liquid concentrates of the present invention may provide advantages in terms of increased stability and ease of storage in the pre-diluted form. It is currently believed these compositions may provide certain advantages over other prior compositions, including liquid concentrate compositions. The compositions of the present invention typically are in the form of a liquid-based suspension or slurry. In accordance with the present invention it has been discovered that incorporating a suspending agent, typically micronized clay, along with a powdered fire retardant facilitates formulating a suspension, or slurry including a certain amount of water having suitable storage stability, that is easy to transport, and can readily be diluted before application. Certain aspects of the present invention, therefore, involve liquid concentrate compositions incorporating a powdered fire retardant(s) and a suspending agent. It is currently believed advantageous compositions can be prepared incorporating any of a variety of ammonium phosphate-based fire retardants including MAP, DAP, and/or APP. Further aspects of the present invention involve compositions containing MAP and DAP as the fire retardants. For example, the use of MAP and DAP, in particular technical-grade sources of MAP and DAP as described herein is currently believed to provide a greater proportion of fire retardant component per unit volume of concentrate. This allows for use of less concentrated composition to prepare a composition having the desired retardant effect, which therefore requires less storage and transport of the concentrated composition.

Further in accordance with the present invention, MAP and DAP-containing formulations described herein are suitable as alternatives to ammonium polyphosphate (APP)-containing formulations. MAP and DAP lack the solubility of ammonium polyphosphates so concentrated compositions of MAP and DAP are usually prepared in powder form. Given this problem, current methods to prepare liquid concentrates comprising MAP and DAP usually include diammonium sulfate (DAS) as a cost-effective alternative to MAP and DAP. In accordance with the present invention it has been found that MAP and DAP can attain high solubility when used in specific ratios. Further, certain aspects of the present invention are directed to use of a suspending agent comprising micronized clay, which promotes the stabilization of the MAP and DAP. Representative examples of micronized clay include attapulgite clay, kaolinite clay, halloysite clay, and bentonite clay. Without being bound by any particular theory, it is currently believed that micronized clay impacts the rheological properties of the liquid concentrate without reducing the solubility of the orthophosphates (MAP and DAP). Moreover, unlike current methods, the liquid concentrate can be prepared without the addition of diammonium sulfates. In this manner, therefore, the present invention is directed to sulfate-free MAP and DAP-containing liquid fire retardant concentrate compositions.

The amount of fire-retardant concentrate required per unit volume/weight of solution of composition and solutions described herein can be lower than similar compositions prepared from liquid concentrates, resulting in the need of less total chemical to gain control of a fire. In certain embodiments, fire-retardant solutions can be considerably more visible to firefighting personnel during firefighting activities which can aid in better placement of the fire-retardant solution and consequently can result in the use of considerably less fire-retardant solution to gain control of the incident.

Therefore, in accordance with the foregoing, in some embodiments, a fire retardant concentrate is provided, the composition comprising a mixture of ammonium phosphates and a suspending agent. In certain preferred embodiments, the mixture of ammonium phosphates comprises monoammonium phosphate (MAP) and diammonium phosphate (DAP). The suspending agent preferably comprises micronized clay.

In additional embodiments, a fire retardant concentrate is provided, the composition comprising one or more ammonium phosphates, a suspending agent and water. In certain embodiments, the composition comprises MAP, DAP, and/or APP. In certain other embodiments, the composition includes a mixture of ammonium phosphates comprising monoammonium phosphate (MAP) and diammonium phosphate (DAP). Preferably, the water constitutes less than 50% by volume of the concentrate composition. In some embodiments, for example, the water can comprise about 40% to 50% by weight of the concentrate composition.

In still further embodiments, a fire retardant concentrate is provided, the composition comprising a mixture of ammonium phosphates and wherein the fire-retardant does not contain a separate sulfate source and is characterized as having a low sulfate content. Sulfates are usually detectable in liquid fire retardant concentrates for two reasons. First, ammonium polyphosphates (usually used as the fire retardant) contain a minimum amount of sulfates (usually up to 2%, see for example, 11-37-0 Ammonium Polyphosphate Solution, LIQUID PRODUCTS LLC). Second, some fire retardant formulations comprise diammonium sulfate. These two sources of sulfates may result in liquid concentrates having reduced potency and efficacy, which increases their corrosiveness and toxicity as more fire-retardant component (and more ammonia) is required to have the same fire retardant effect.

In accordance with the present invention, the fire-retardant concentrates can be prepared using technical grade MAP and DAP which include low levels of detectable sulfates. For example, certain compositions of the present invention contain less than about 1% by total weight, less than about 0.5% by total weight, or less than about 0.4% by total weight sulfates. Often, the compositions contain even lower levels of sulfates such as, for example, less than about 0.3% by total weight, less than about 0.2% by total weight of sulfates, or even lower. In other instances, the concentrates can be prepared using fertilizer grade MAP and DAP which can contain higher levels of sulfates of up to about 5% by total weight, or even higher (e.g., about 6% by total weight).

As noted, various aspects of the present invention involve liquid fire retardant concentrate compositions containing one or more powdered fire retardants dispersed throughout an aqueous medium. The aqueous medium typically comprises or consists essentially of water. As used herein, it is to be understood that reference to dispersion of the fire retardant(s) throughout the aqueous medium contemplates both dissolution (complete and partial) of the fire retardant(s) in the aqueous medium and suspension of the fire retardant(s) throughout the aqueous medium. Advantageously, it has been discovered that incorporating a suspending agent as detailed herein allows for incorporation of a relatively high proportion of fire retardant per unit volume of aqueous medium. Such high strength concentrates are suitable for forming higher strength fire retardant solutions or for providing the same strength fire retardant solution at a reduced volume, thus requiring less storage space and materials for storage.

Fire Retardant Components (e.g., Ammonium Phosphates)

Any of the liquid fire retardant concentrate compositions provided herein can comprise at least one ammonium phosphate. In certain embodiments, the ammonium phosphate comprises, consists essentially of, or consists of monoammonium phosphate (MAP). In other embodiments, the ammonium phosphate comprises, consists essentially of, or consists of diammonium phosphate (DAP). In still other embodiments, the ammonium phosphate comprises, consists essentially of, or consists of ammonium polyphosphate (APP). In some embodiments, the liquid fire retardant concentrate compositions provided herein comprise a mixture of ammonium phosphates. In certain embodiments, the ammonium phosphate or mixture of ammonium phosphates has a molar ratio of ammoniacal nitrogen to phosphorus (N/P ratio) in a range from about 1.1 to about 1.9. In certain embodiments, the ammonium phosphate or mixture of ammonium phosphates has a molar ratio of ammoniacal nitrogen to phosphorus (N/P ratio) in a range from about 1.35 to about 1.65. In certain embodiments, the ammonium phosphate or mixture of ammonium phosphates has a molar ratio of ammoniacal nitrogen to phosphorus (N/P ratio) in a range from about 1.4 to about 1.6. In certain embodiments, the ammonium phosphate or mixture of ammonium phosphates has a molar ratio of ammoniacal nitrogen to phosphorus (N/P ratio) in a range from any of about 1.1, 1.2, 1.3, 1.35, 1.4, 1.5, 1.6, 1.7, or 1.8 to any of about 1.2, 1.3, 1.4, 1.5, 1.6, 1.65, 1.7, 1.8, or 1.9. The concentrate and its solutions generally contain less ammonia in comparison with previous products, and can result for example, in a lower aquatic toxicity.

In various embodiments, the composition includes a mixture of ammonium phosphates, typically at least two ammonium phosphates. In certain embodiments, the mixture of ammonium phosphates comprises, consists essentially of, or consists of monoammonium phosphate (MAP) and diammonium phosphate (DAP). In certain embodiments, the MAP contains from about 10% or 11% to about 12% ammonia by weight and from about 40% or 55% to about 61% phosphorus pentoxide by weight. In certain embodiments, the DAP contains from about 16% to about 21% ammonia by weight and from about 40% to about 54% phosphorus pentoxide by weight. Further, in certain embodiments, the weight ratio of MAP to DAP is in the range of from about 5% to about 60% MAP to about 40% to about 95% DAP of the total ammonium phosphate in the concentrate. In certain embodiments, the weight ratio of MAP to DAP is in the range of from about 40% to about 60% MAP to about 40% to about 60% DAP of the total ammonium phosphate in the concentrate. In certain embodiments, the weight ratio of MAP to DAP is in the range of from about 50% to about 60% MAP to about 40% to about 50% DAP of the total ammonium phosphate in the concentrate.

In further embodiments, the composition comprises from about 19% to about 50% by weight of DAP. The composition can comprise from about 19% to about 47% by weight of DAP. For example, the composition can comprise from about 20% to 30% of DAP. In some instances, the composition comprises from about 25% to about 27% by weight of DAP (e.g., about 26%).

In further embodiments, the composition comprises from about 1% to about 30% of MAP. The composition can comprise from about 10% to about 30% of MAP. For example, the composition can comprise from about 20% to about 30% by weight of MAP. In some instances, the composition comprises from about 22% to about 24% by weight of MAP (e.g., about 23%).

As noted above, in accordance with the present invention various embodiments incorporate the MAP and DAP within certain preferred ratios to enhance solubility of the ammonium phosphates. Therefore, in certain embodiments, the weight ratio of MAP to DAP is from about 40:60 to about 60:40, or from about 45:55 to about 55:45 (e.g., about 46:54 or about 47:53).

In certain embodiments, the APP contains from about 12% to about 17% ammonia by weight and from about 68% to about 75% phosphorus pentoxide by weight. Further, in certain embodiments, the weight ratio of APP to MAP and/or DAP is in the range of from about 5% to about 60% APP to about 40% to about 95% MAP and/or DAP of the total ammonium phosphate in the concentrate. In certain embodiments, the weight ratio of APP to MAP and/or DAP is in the range of from about 40% to about 60% APP to about 40% to about 60% MAP and/or DAP of the total ammonium phosphate in the concentrate. In certain embodiments, the weight ratio of APP to MAP and/or DAP is in the range of from about 50% to about 60% APP to about 40% to about 50% MAP and/or DAP of the total ammonium phosphate in the concentrate.

In further embodiments, the composition comprises from about 1% to about 60% by weight of APP. The composition can comprise from about 10% to about 50% by weight of APP. For example, the composition can comprise from about 10% to 40% of APP. In some instances, the composition comprises from about 10% to about 30% by weight of APP (e.g., about 20%).

Further, whether incorporated alone or along with one or more other fire retardants, the ammonium polyphosphate may be characterized by its chain length. Suitable APP fire retardants for use in powder form typically have a chain length with a value of at least about 100, at least about 500, or at least about 1000. Typically, the chain length for powder APP fire retardants is from about 100 to about 1500, or from about 100 to about 1000.

Suspending Agents and Biopolymers

Any of the fire retardant concentrate compositions of the present disclosure can comprise a suspending agent. Suitable suspending agents for the liquid concentrates described herein include micronized clays. Suitable micronized clays for the present invention include attapulgite clays, kaolinite clays, halloysite clays, bentonite clays, and combinations thereof. In certain embodiments, the micronized clay constitutes at least about 1% of a concentrate formulation. In some embodiments, the micronized clay constitutes about 1% to about 7% by weight of the concentrate. For example, the micronized clay can constitute about 2% to about 5% or from about 2% to about 3% by weight of the concentrate. The amount of micronized clay can influence the viscosity of the concentrated form, with higher levels preferred when a thicker (more viscous) concentrate is desired. Such concentrates are typically utilized to form fire retardant solutions containing less than about 2% by weight of micronized clay, or less than about 1% by weight of micronized claim. For example, suitable fire retardant solutions may contain from about 0.25% to about 0.75% by weight (e.g., from about 0.25% by weight to about 0.5% by weight, or from about 0.4% by weight to about 0.5% by weight).

Any of the fire retardant concentrate compositions of the present disclosure can comprise a biopolymer. The biopolymer can constitute from about 1% to about 5%, or from about 1% to about 3%, from about 1% to about 2%, or from about 1% to about 1.5% by weight of the concentrate. Representative examples of biopolymers include xanthan gum, rhamsan gum, welan gum, diutan gum, and mixtures thereof. In certain embodiments, the biopolymer is xanthan gum. In certain embodiments, the amount of xanthan gum is from about 1% to about 5%, from about 1% to about 3%, from about 1% to about 2%, or from about 1% to about 1.5% by weight of the total concentrate composition.

In some cases, the fire retardant concentrate composition comprises both a micronized clay and a biopolymer. A combination of a micronized clay and a biopolymer in the concentrate allows for dual control of the viscosity of the liquid concentrate in concentrated and diluted form. In some embodiments, the weight ratio of micronized clay to biopolymer can be from about 1:1 to about 4:1. In certain embodiments the weight ratio of micronized clay to biopolymer can be from about 1:1 to about 3:1. For example, the weight ratio of micronized clay to biopolymer can be from about 1:1 to about 2:1.

Water Content

Any of the liquid fire retardant concentrate compositions provided herein can further comprise water. In some embodiments, the water constitutes less than 50% by volume of the concentrate composition. Preferably, the water constitutes about 10 to 50% by weight of the total concentrate composition. More preferably, the water constitutes about 30% to about 50% by weight of the total concentrate. Most preferably, the water constitutes about 40% to about 50% by weight of the total concentrate composition.

When prepared as a liquid concentrate, as described herein, the fire retardant component (e.g., the mixture of ammonium phosphates) can constitute less than about 75% by weight of the composition. Preferably, the fire retardant component constitutes from about 40% to about 60% by weight of the composition.

Corrosion Inhibitors

The fire-retardant concentrate compositions can also comprise a corrosion inhibitor.

In certain embodiments, the corrosion inhibitor comprises a biopolymer. Representative examples of biopolymers include xanthan gum, rhamsan gum, welan gum, diutan gum and mixtures thereof. It is believed that such biopolymers impact both the rheological properties and the corrosion properties of the fire-retardant solutions. In certain embodiments, the corrosion inhibitor system can comprise a micronized clay complexed with diammonium phosphate (DAP), a molybdate corrosion inhibitor, an azole corrosion inhibitor, a pyrophosphate or any combination thereof.

In some embodiments, the corrosion inhibitor comprises a micronized clay complexed with diammonium phosphate (DAP) and/or monoammonium phosphate (MAP). These clays have an affinity for both MAP and DAP such that the phosphates can intercalate in the lattice of the material. When the fire retardant concentrate composition comprises a micronized clay complexed with DAP and/or MAP as the corrosion inhibitor, the composition can be understood to contain both "free" (from the dissolved fire retardant) DAP and/or MAP and "complexed" (from the micronized clay) DAP and/or MAP. Although the complexed DAP and/or MAP cannot act as a fire retardant in the complexed state, when the concentrate is diluted to prepare a fire retardant solution as described below, the excess water helps release and dissolve the complexed DAP and/or MAP, thus converting it to free DAP and/or MAP and increasing the efficacy of the overall fire retardant solution. Thus, using micronized clay complexed with DAP and/or MAP as a corrosion inhibitor can provide the dual benefit of decreasing corrosion and increasing levels of DAP and/or MAP above and beyond the limits of solubility in the concentrated form, thus increasing the strength of the overall concentrate. In some embodiments therefore, the ratio of free DAP to complexed DAP is about 90:10. For example, the ratio of free DAP to complexed DAP can be about 95:5. In some embodiments, the ratio of free MAP to complexed MAP is about 90:10. For example, the ratio of free MAP to complexed MAP can be about 95:5. Suitable claims are commercially available from Applied Minerals Inc.

The corrosion inhibitor system can also comprise a molybdate corrosion inhibitor. In certain embodiments, the corrosion inhibitor system comprises anhydrous sodium molybdate, its dihydrate, or mixtures thereof. In certain embodiments, the amount of anhydrous sodium molybdate, its dihydrate, and mixtures thereof is from about 0.01% to about 2.0% by weight of the total concentrate concentration. In certain embodiments, the amount of anhydrous sodium molybdate, its dihydrate, mixtures thereof is from about 0.05% to about 0.3% by weight of the total concentrate concentration. In certain embodiments, the amount of anhydrous sodium molybdate, its dihydrate, and mixtures thereof is from any of about 0.01%, 0.05%, 0.1%, 0.2%, 0.3%, 0.4%, or 0.5% to any of about 0.05%, 0.1%, 0.2%, 0.3%, 0.5%, 0.6%, 0.7%, 0.8%, 0.9%, 1.0%, or 2.0% by weight of the total concentrate composition.

The corrosion inhibitor system can also comprise an azole corrosion inhibitor. In certain embodiments, the azole corrosion inhibitor comprises tolytriazole and/or benzotriazole. Preferably, the azole corrosion inhibitor comprises tolytriazole. In certain embodiments, the amount of the azole corrosion inhibitor is from about 0.01% to about 2.0% by weight of the total concentrate concentration. In certain embodiments, the amount of the azole corrosion inhibitor is from about 0.05% to about 0.3% by weight of the total concentrate concentration. In certain embodiments, the amount of the azole corrosion inhibitor of is from any of about 0.01%, 0.05%, 0.1%, 0.2%, 0.3%, 0.4%, or 0.5% to any of about 0.05%, 0.1%, 0.2%, 0.3%, 0.5%, 0.6%, 0.7%, 0.8%, 0.9%, 1.0%, or 2.0% by weight of the total concentrate composition.

In some embodiments, the corrosion inhibitor can comprise a molybdate corrosion inhibitor and an azole corrosion inhibitor (for example, sodium molybdate and tolytriazole). The corrosion inhibitor system can constitute from about 0.02% to about 4% by weight of the total concentrate composition. Often, the corrosion inhibitor system constitutes from about 0.02% to about 4% by weight of the total concentrate composition when two or more corrosion inhibitors are used (for example, sodium molybdate and tolytriazole).

In certain embodiments, the corrosion inhibitor system can optionally comprise one or more components such as sodium silicofluoride (SSF), sodium thiosulfate (STS), and dimercaptothiadiazole (DMTD). However, in certain embodiments, these corrosion inhibitor components are not required. In certain embodiments, the corrosion inhibitor system does not contain one or more of sodium silicofluoride (SSF), sodium thiosulfate (STS), and dimercaptothiadiazole (DMTD). Likewise, in certain embodiments, a solution produced from a fire-retardant concentrate composition described herein may or may not contain one or more of sodium silicofluoride (SSF), sodium thiosulfate (STS), and dimercaptothiadiazole (DMTD).

Pigments/Dyes and Opacifiers

In some embodiments, the liquid fire retardant concentrate is prepared as an uncolored formulation. However, in other embodiments, the liquid fire retardant concentrate can comprise a pigment or a dye. In certain aspects, the pigment or dye comprises red iron oxide, brown iron oxide, titanium dioxide or a fugitive pigment or dye. In some embodiments, the pigment or dye can comprise a fugitive color system.

The pigment or dye can be magenta in color. In certain embodiments, the pigment or dye is UV sensitive. In certain embodiments, the pigment or dye is formaldehyde-free. In certain embodiments, the pigment or dye is a fluorescent pigment or dye. In certain embodiments, the pigment or dye has a Lab color spacing of "L" in a range from about 34 to about 89, "a" in a range from about 18 to about 83 and "b" in a range from about −61 to about 56. The LAB color space model was developed by the International Commission of Illumination (CIE) and is one convention of describing colors. The model has a 3 axis system. The L* represents the lightness and is on the vertical axis. The "0" on bottom of the vertical axis indicates the absence of light. The maximum lightness is on the top "100". The a* is on the horizontal axis indicating red (−a) to green (a+). The b* is on the horizontal axis indicating blue (−b) to yellow (+b). The center of the axis is neutral. (See, for example, www.colourphil.co.uk/lab_lch_colour_space.shtml.)

In preferred embodiments, the liquid fire retardant concentrate comprises a fugitive color system. Preferably, the liquid concentrate comprising the fugitive color system is storage-stable and results in little to no loss of color over long storage. The fugitive color system can comprise a fugitive color pigment. The fugitive color pigment can exhibit hydrophilic or diminished hydrophobic tendencies. In certain instances, the fugitive color pigment is fluorescent. The fugitive color pigments that may be incorporated into the liquid concentrates described herein may be significantly easier to wet, incorporate, disperse and or homogenize within the liquid concentrate compared to other color pigments.

In some embodiments, the fugitive color system comprises a fugitive pigment and a water insoluble opaque material (e.g., an opacifier). The fugitive pigment comprises a dye encapsulated within a polymeric material. One purpose for encapsulating the dye within the polymer material is so that the dye does not stain the people, equipment, etc. with which it comes into contact. In certain aspects, the polymeric material can be, for example, petroleum resins (CAS #64742-16-1), melamine (CAS #108-78-1), and the like as known to one of ordinary skill in the art. In certain aspects, the dye is a fluorescent dye. In certain aspects, the dye and the polymer work together to achieve fluorescence, e.g., the dye and resin combination comprising the fugitive pigment fluoresces. The fugitive pigment used in the concentrates herein preferably exhibits hydrophilic or reduced hydrophobic behavior in comparison to other fugitive pigments. In certain aspects, the fugitive pigment is hydrophilic. In certain aspects, the fugitive pigment is easy to incorporate into an aqueous media. In certain aspects, the fugitive pigment more easily incorporates into an aqueous media in comparison to a control fugitive pigment that does not exhibit hydrophilic behavior and/or is not hydrophilic. For example, a hydrophobic control fugitive pigment containing Solvent Red 1 dye CAS #1229-55-6, two hydrocarbon resins CAS #64742-16-1 and CAS #64742-94-5, and $TiO_2$ CAS #13463-67-7 opacifier, in the amounts of 80-88% resin, 7-10% dye, and 5-10% TiO2 opacifier.

An opaque material (e.g., an opacifier) is one that is neither transparent nor translucent and by "water insoluble," it is meant that the water solubility is ≤5% as determined by the art established standard ISO 787-3, which is incorporated herein by reference in its entirety. In certain aspects, the water insoluble opaque material comprises a finely divided iron oxide pigment, zinc ferrite, tri-calcium phosphate, barium phosphate, or titanium dioxide. In certain aspects, the water insoluble opaque material comprises a finely divided iron oxide pigment. In certain aspects, the opacifier is in a minor amount. In certain aspects, the opacifier is in an amount of about 0.05% to about 4.0% (e.g., about 0.1% to about 0.8%) by weight of the total composition. In certain aspects, the fugitive colored liquid long-term fire retardant exhibits a hue optically visible to the human eye when applied as relatively thin (⅛th inch thick) films on the trees, brush, grasses, and mixtures thereof, that are encountered in wildland and other under developed fire-prone rural areas.

In certain aspects, a fugitive pigment suitable for the concentrates herein, exhibiting hydrophilic behavior and/or a fugitive pigment that is hydrophilic is a fluorescent fugitive pigment. Representative fluorescent pigments useful in this disclosure are, for example, described in U.S. Pat. No. 5,439,968 "Fluorescent Pigment Concentrates," which is incorporated herein by reference in its entirety for all relevant purposes.

In certain aspects, the fugitive pigment or dye is magenta. In certain aspects, the fugitive pigment or dye is a fluorescent magenta in color. In certain aspects, the fluorescent pigment or dye has a Lab color spacing of "L" in a range from about 34 to about 89, "a" in a range from about 18 to about 83, and "b" in a range from about −61 to about 56. It was observed that a magenta fluorescent fugitive pigment was an optimum colorant based on its visibility within the many colors found in wildland brush, timber, trees, grasses, etc. However, one of ordinary skill in the art will recognize that the fugitive pigments of this disclosure are not limited to magenta or fluorescent magenta.

In certain aspects, a fluorescent fugitive pigment is any one of the ECO Pigments manufactured by DayGlo Corporation. In certain aspects, the fluorescent fugitive pigment is ECO-20, Ultra Violet manufactured by DayGlo Corporation. In certain aspects, the fluorescent fugitive pigment is ECO-21, Corona Magenta manufactured by DayGlo Corporation (1-5 weight % C.I. Basic Violet 11, CAS-No. 2390-63-8 and 1-5 weight % C.I. Basic Red 1:1, CAS-No. 3068-39-1; melting/freezing point 145° C.-150° C.; specific gravity 1.2). In certain aspects, the fluorescent fugitive pigment is ECO-15, Blaze Orange manufactured by DayGlo Corporation. In certain aspects, the fluorescent fugitive pigment is ECO-14, Fire Orange manufactured by DayGlo Corporation. In certain aspects, the fluorescent fugitive pigment is ECO-13, Rocket Red manufactured by DayGlo Corporation. In certain aspects, the fluorescent fugitive pigment is ECO-11, Aurora Pink manufactured by DayGlo Corporation. In certain aspects, the fluorescent fugitive pigment is ECO-21, Corona Magenta manufactured by DayGlo Corporation. In certain aspects, the fluorescent fugitive pigment is Magenta 108PB distributed by Royale Pigments & Chemicals (Appendix A).

Thus, in some embodiments, the fire retardant concentrate compositions described herein can comprise a dye or pigment. In some embodiments, the dye or pigment comprises red iron oxide, brown iron oxide, or a fugitive pigment or dye. The fugitive pigment or dye can be magenta in color. In certain embodiments, the dye or pigment comprises a fugitive color system. The fugitive color system can, preferably, comprise a water insoluble opaque material and a fugitive pigment. The water insoluble opaque material can comprise ferric oxide, titanium dioxide, zinc ferrite, or any combination thereof. In embodiments, the water insoluble opaque material constitutes from about 0.05 to about 4% by weight of the total composition. The fugitive pigment can comprise a fugitive dye encapsulated within a polymeric material, exhibiting hydrophilic behavior. The fugitive pigment can be magenta in color. In embodiments, the fugitive pigment has a Lab color spacing of "L" in a range from about 34 to about 89, "a" in a range from about 18 to about 83, and "b" in a range from about −61 to about 56. In certain embodiments, the fugitive dye or pigment constitutes from about 1% to about 2% by weight of the total composition.

Additional Components

In certain embodiments, the fire-retardant concentrate composition comprises additional components, for example, benzotriazole, tolyltriazole, sodium benzoate, mercaptobenzothiazole, or combinations thereof. In further embodiments, the compositions can comprise additional components more selected from the group consisting of an iron containing pigment, a titanium containing pigment, a fugitive pigment or dye, a surfactant, a foam controlling additive (e.g., PLURONIC® L-101), biocides, and any combination thereof.

Physical Properties of Liquid Concentrate

In certain embodiments, the liquid fire retardant concentrate composition described herein can have a density of from about 1.1 to about 1.5. In some embodiments, the liquid fire retardant concentrate can exhibit a viscosity of about 100 cP to about 1000 cP, about 100 cP to about 800 cP, or about 100 cP to about 300 cP when measured in accordance with the methods described in Specification 5100-304d. In some embodiments, the liquid fire retardant concentrate can have an acidic pH. For example, the liquid fire retardant concentrate can have a pH of from about 5 to 6.

Preparing a Fire Retardant Concentrate

Provided herein are methods of preparing a liquid fire retardant concentrate. The methods comprise dissolving the one more fire retardants at the concentrations described herein in water. The following discussion focuses on the use of MAP and DAP, but it is to be understood that other fire retardants and combinations thereof can also use used in the methods detailed herein. The other components such as a suspending agent, biopolymer, corrosion inhibitor, pigment or dye or any other component as described herein may be added to the solution once MAP and DAP are dissolved. The other components may be added in any order. Preferably, methods for preparing the liquid concentrate include adding micronized clay to the MAP and DAP solution. Thus, the method of preparing a liquid concentrate comprising MAP and DAP described herein does not comprise adding diammonium sulfate to the solution. In further embodiments, methods for preparing the liquid concentrate comprise adding micronized clay and a biopolymer to the MAP and DAP solution. Without being bounded by theory, it has been found that a liquid concentrate may be successfully prepared when the biopolymer (e.g., xanthan gum) is added to the solution after MAP and DAP are dissolved. By adhering to this order, the biopolymer is added to a solution having a very high salt content, which prevents it from hydrating prematurely (which would result in a prohibitively viscous concentrate). It is also contemplated that a liquid concentrate may be prepared without a biopolymer. For instance, a biopolymer may be added directly to the fire-retardant solution prepared from the concentrate, as described below, to control the viscosity of the solution.

Fire Retardant Solutions

Provided for herein are fire-retardant solutions prepared by mixing a fire-retardant concentrate composition, as described anywhere herein, with water to form an aqueous solution. In certain embodiments, a homogenous solution is formed. In certain embodiments, the water contains low levels of bacterial contamination that can impact viscosity and/or stability by consuming biopolymers. Thus, in certain embodiments, the water contains a biocide to prevent bacterial contamination. In certain embodiments, the solution comprises insoluble components. In certain embodiments, the solution is prepared by combining at least 5 volumes of water per volume of concentrate. In certain embodiments, the ratio of water to concentrate is from about 5 volumes to about 7 volumes of water to about 1 volume of concentrate.

These dilution levels result in a fire-retardant solution having a lower density in comparison to state of the art fire-retardant solutions with equivalent performance characteristics, which in turn, can either reduce the weight of a fully loaded aircraft or increase the volume that an aircraft is capable of carrying. This factor can reduce the hazards associated with aerial firefighting. Further the mix or dilution rate of the concentrate can be predetermined by evaluation of its performance in retarding the rate of flame spread and fuel consumption.

In certain embodiments, a fire-retardant solution exhibits an aluminum corrosion rate equal to or less than 2.0 milli-inches or less than 1.0 milli-inches per year. In certain embodiments, a fire-retardant solution exhibits a mild steel corrosion rate equal to or less than 5.0 milli-inches per year. In certain embodiments, a fire-retardant solution exhibits a brass corrosion rate equal to or less than 5.0 milli-inches per year. In certain embodiments, a fire-retardant solution exhibits two or more of the above described corrosion rates for magnesium, aluminum, mild steel and/or brass.

In certain embodiments, a fire-retardant solution meets one or more of the required criteria for of U.S. Department of Agriculture, Forest Service, Specification Number 5100-304d, January 2020, including any and all amendments.

In certain embodiments, a fire-retardant solution meets one or more of the required criteria for corrosion and/or stability of U.S. Department of Agriculture, Forest Service, Specification Number 5100-304d, January 2020, including all amendments.

In certain embodiments, a fire-retardant solution meets all of the required criteria for corrosion of U.S. Department of Agriculture, Forest Service, Specification Number 5100-304d, January 2020, including all amendments.

In certain embodiments, a fire-retardant solution meets all of the required criteria for stability of U.S. Department of Agriculture, Forest Service, Specification Number 5100-304d, January 2020, including all amendments.

In certain embodiments, a fire-retardant solution meets all of the required criteria for corrosion and stability of U.S. Department of Agriculture, Forest Service, Specification Number 5100-304d, January 2020, including all amendments.

In certain embodiments, a fire-retardant solution meets all of the required criteria of U.S. Department of Agriculture, Forest Service, Specification Number 5100-304d, January 2020, including all amendments.

In certain embodiments, the fire-retardant solution exhibits a viscosity in the range of from about 100 cPs to about 1500 cPs, from about 100 cPa to about 1000 cps, or from about 100 cPs to about 800 cPs, or from about 100 cPs to about 300 cPs when measured in accordance with Specification 5100-304d, January 2020, including any and all amendments.

The disclosed solutions also exhibit low aquatic toxicity. For example, in certain embodiments, a solution exhibits an aquatic toxicity (LC50) in the range of from about 180 milligrams per liter to about 1500 milligrams per liter. In certain embodiments, a solution exhibits an aquatic toxicity (LC50) greater than about 180, 200, 500, 1000, 2000, or 2500 milligrams per liter. In certain embodiments, a solution exhibits an aquatic toxicity (LC50) in the range of from any of about 180, 200, 500, 750, 1000, 2000, or 2500 milligrams per liter to any of about 200, 500, 1000, 2000, 2500, or 2700 milligrams per liter (e.g., about 980 milligrams per liter).

In certain embodiments, a fire-retardant solution has a pH in the range of from about pH 4.0 or 5.0 to about pH 8.0. In certain embodiments, a fire-retardant solution has a pH in the range of from about pH 6.0 about pH 8.0. In certain embodiments, a fire-retardant solution has a pH in the range of from about pH 6.0 to about pH 7.0. In certain embodiments, a fire-retardant solution has a pH in the range of from about pH 6.0 to about pH 6.5. In certain embodiments, a fire-retardant solution has a pH in the range of from about pH 6.1 to about pH 6.3. In certain embodiments, a fire-retardant solution has an acidic pH.

In certain embodiments, visibility of the applied solution is improved, allowing firefighting forces to draw an effective chemical fire barrier using less total solution.

In certain embodiments, the liquid fire retardant concentrate has a higher strength than comparative liquid fire retardant concentrates. For example, the liquid fire retardant concentrate can comprise a higher proportion of the fire retardant component (e.g., the ammonium phosphates) per unit volume. Consequently, less of the concentrate is required to make a fire retardant solution of equivalent strength to one prepared by other liquid concentrates. This results in a safer, less toxic, less corrosive and more economical fire retardant concentrate and solution compared to currently available options.

Method of Making a Fire Retardant Solution

Disclosed herein are methods of making a fire-retardant solution by mixing a fire-retardant concentrate composition described anywhere herein with water. In certain embodiments, a fire-retardant concentrate is added to water and mixed until a solution is obtained. In certain embodiments, the solution is a homogeneous solution. In certain embodiments, the mixing involves combining at least five volumes of water per volume of concentrate. In still further embodiments, five to seven volumes of water are combined with one volume of concentrate.

In certain embodiments, the fire retardant solution is prepared immediately before use.

Method of Combatting a Wildfire

Disclosed herein are methods of combatting a wildfire by applying a fire-retardant solution described anywhere herein for the purpose of suppressing, containing, controlling, or extinguishing, etc., a wildfire. In certain embodiments, the fire-retardant solution is applied directly onto a flaming fuel. In other embodiments, the fire-retardant solution is applied indirectly, e.g., in front of or parallel to the moving fire front. The distance between the advancing fire and the retardant fire-break depends on the rate that the solution can be applied, the rate of spread of the moving fire front, and the presence or absence of a natural fuel break identified by changes in the geometry of the ground being threatened. In certain embodiments, the fire-retardant solution is applied from a ground platform such as a fire-engine. In certain embodiments, the fire-retardant solution is applied from an aerial platform such as a fixed-wing aircraft or a rotary-wing aircraft. For example, in certain embodiments, the fire-retardant solution is applied from a rotary-wing aircraft such as a helicopter utilizing a bucket which is slung below the helicopter and in other embodiments the fire-retardant solution is contained within tanks mounted in or attached externally to the helicopter. In other embodiments, the fire retardant solution is applied from a mix of all of those listed vehicles or platforms. Obviously, the safety of the solution relative to aircraft corrosion and fouling of critical components must be greater when the solution is within or in contact with the aircraft.

Having described the invention in detail, it will be apparent that modifications and variations are possible without departing from the scope of the invention defined in the appended claims.

EXAMPLES

The following non-limiting examples are provided to further illustrate the present invention.

Example 1: Liquid Fire Retardant Concentrate Comprising MAP and DAP

A liquid fire retardant concentrate (LC) containing the following components was prepared. The composition was prepared by first dispersing the MAP and DAP components in water, followed by addition of the other components.

TABLE 1

| Raw Material | LC |
| --- | --- |
| Di-ammonium phosphate (DAP) | 26.24 |
| Mono-ammonium phosphate (MAP) | 23.27 |
| Water | 44.89 |
| Biopolymer | 1.35 |
| Micronized clay | 2.25 |
| Magenta fugitive pigment | 1.58 |
| Opacifier | 0.15 |
| Azole corrosion inhibitor | 0.17 |
| Molybdate corrosion inhibitor | 0.10 |

Example 2: Preparation of Diluted Fire Retardant Solution and Properties Thereof A diluted fire retardant solution (DS) was prepared by combining 5.2 parts of water with 1 part of the liquid concentrate to provide a diluted solution having the following composition:

TABLE 1A

| Raw Material | LC |
| --- | --- |
| Di-ammonium phosphate (DAP) | 5.26 |
| Mono-ammonium phosphate (MAP) | 4.66 |
| Water | 9.0 |
| Biopolymer | 0.27 |
| Micronized clay | 0.45 |
| Magenta fugitive pigment | 0.32 |
| Opacifier | 0.03 |
| Azole corrosion inhibitor | 0.03 |
| Molybdate corrosion inhibitor | 0.02 |
| Total: | 20.04* |

*Water content listed is water from concentrate formulation. Remainder of diluted dilution (79.96%) is water of dilution.

TABLE 2

| Property | LC | DS |
| --- | --- | --- |
| Density (g/ml) at 21.1° C. | 1.332 | 1.058 |
| Density (g/ml) at 10.0° C. | 1.339 | 1.067 |
| Density (g/ml) at 32.2° C. | 1.326 | 1.058 |
| pH at 21.1° C. | 5.85 | 6.25 |
| Viscosity (cP) under rotational shear ~12 $s^{-1}$ and 21.1° C. | 228 | 220 |

Example 3: Additional Liquid Concentrate Formulations

A series of liquid concentrates in accordance with the present invention are described in Table 3. The biopolymer can be selected from xanthan gum, rhamsan gum, welan gum and diutan gum. The micronized clay can be selected from attapulgite clay, kaolinite clay, or halloysite clay. The opacifier can be selected from ferric oxide, titanium dioxide, and zinc ferrite. The molybdate corrosion inhibitor can be selected from sodium molybdate, potassium molybdate, and lithium molybdate.

TABLE 3

| Raw Material | LC1 | LC2 | LC3 | LC4 | LC5 |
|---|---|---|---|---|---|
| Di-ammonium phosphate (DAP) | 47.03 | 35 | 26 | 15 | 19.80 |
| Mono-ammonium phosphate (MAP) | 2.47 | 15 | 24 | 35 | 29.70 |
| Water | 10-50 | 10-50 | 10-50 | 10-50 | 10-50 |
| Biopolymer | 1.0-3.0 | 1.0-3.0 | 1.0-3.0 | 1.0-3.0 | 1.0-3.0 |
| Micronized clay | 1.0-7.0 | 1.0-7.0 | 1.0-7.0 | 1.0-7.0 | 1.0-7.0 |
| Magenta fugitive pigment | 0.01-3.0 | 0.01-3.0 | 0.01-3.0 | 0.01-3.0 | 0.01-3.0 |
| Opacifier | 0.05-4.0 | 0.05-4.0 | 0.05-4.0 | 0.05-4.0 | 0.05-4.0 |
| Azole corrosion inhibitor | 0.01-2.0 | 0.01-2.0 | 0.01-2.0 | 0.01-2.0 | 0.01-2.0 |
| Molybdate corrosion inhibitor | 0.01-2.0 | 0.01-2.0 | 0.01-2.0 | 0.01-2.0 | 0.01-2.0 |

The physical properties listed in Table 4 can be determined.

TABLE 4

| Physical Property |
|---|
| Density (g/ml) at 21.1° C., 10.0° C. and 32.2° C. |
| pH at 21.1° C. |
| Viscosity (cP) under rotational shear ~$12s^{-1}$ and 21.1° C. |

Example 4: Corrosion Inhibition

One part of each liquid concentrate prepared in accordance with the present invention will be individually mixed with 3 to 7 parts water to form diluted solutions. Each liquid concentrate and diluted solution will be subjected to corrosion testing in accordance with the Forest Service Specifications for corrosion testing of fire retardants. Corrosion tests will be performed on mild steel, aluminum, magnesium and brass.

In accordance with said specifications, a one-inch wide, four inch long, one-eighth inch thick coupons of mild steel, aluminum, magnesium or brass (obtained from a standard source) will be cleaned, dried and weighed according to standard USDA, Forest Service Specification Protocols and suspended in a one quart, straight sided jar filled either 50% (partially) or 100% (totally) using a piece of nylon string. When suspended in a partially full jar, the coupon will be 50% (two-inches) immersed in the test solution with the other 50% extending up from the solution into the air space above it. When the jar is filled with approximately 800 mL of the concentrate or solution, the coupon will be full immersed in the concentrate or solution. The jars will be closed with a screw cap and two or three identical corrosion jars (cells) of each partially and totally immersed coupons will be stored at 70° F. and 120° F. for ninety days.

At the end of the ninety day storage period, the jars will be opened and the coupons removed and cleaned according to the USDA, Forest Service Specifications. Once dried, each coupon will be re-weighed and any weight loss determined by comparing its initial and final weights. The calculated weight loss and density of the metal coupon will be used to extrapolate to mils (0.001 inches) of aluminum that would be lost during a one-year period at the test condition, assuming that the weight loss is experienced uniformly across the coupon surface. The corrosion rate of both partially and totally immersed coupons will be calculated using the total surface rea of the coupon.

Optimum corrosion rates (e.g., those that pass regulations) will not exceed 5.0 mpy for mild steel, 2.0 mpy for aluminum, 4.0 mpy for magnesium, and 5.0 mpy for brass.

Example 5: Liquid Concentrates and Diluted Solutions

Following are examples of compositions of various fire retardant concentrate compositions and various properties determined for these compositions. Various of these concentrate compositions (e.g., J through N) exhibit one or more advantageous properties after dilution including, for example, viscosity, stability, etc.

| | 47-53 (A) (Comparative) % by weight | | 89-11 (B) (Comparative) % by weight | |
|---|---|---|---|---|
| MAP-DAP ratios | Conc | Dil | Conc | Dil |
| MAP | 23.81 | 4.65 | 27.49 | 8.32 |
| DAP | 26.85 | 5.25 | 3.39 | 1.03 |
| Water | 40.52 | 88.38 | 59.44 | 87.73 |
| Biopolymer | 2.93 | 0.57 | 4.40 | 1.33 |
| Fugitive color | 2.96 | 0.58 | 3.12 | 0.94 |
| Azole corrosion inhibitor | 0.28 | 0.05 | 0.26 | 0.08 |
| Molybdate corrosion inhibitor | 0.22 | 0.04 | 0.20 | 0.06 |
| Flow conditioner | 2.00 | 0.39 | 1.25 | 0.38 |
| Opacifier | 0.28 | 0.05 | 0.30 | 0.09 |
| Defoamer | 0.15 | 0.03 | 0.15 | 0.05 |
| Micronized clay | — | — | — | — |
| Micronized clay | — | — | — | — |
| Total | 100.00 | 100.00 | 100.00 | 100.00 |
| | parts water to 1 part concentrate | | parts water to 1 part concentrate | |
| Actual mix ratio used | N/A | | N/A | |
| Mix ratio to reach 10.6% DAP equivalency | 5.37 | | 2.82 | |
| % $P_2O_5$ in Dil | 5.64 | | 5.62 | |
| Actual DAP Equivalency | 10.59 | | 10.59 | |

| | 47-53 (A) (Comparative) | 89-11 (B) (Comparative) |
|---|---|---|
| MAP-DAP ratios | | |
| Total Salt In Conc. | 50.66 | 30.88 |
| N/P Ratio | 1.53 | 1.11 |
| Specific Gravity Conc. | | |
| S.G (g/ml) | 1.30 | 1.22 |
| S.G (lbs/gal) | 10.85 | 10.18 |
| Refractive Index Dil | N/A   N/A | N/A   N/A |
| Viscosity (cP) | | |
| Concentrate | 80 | 1700 |
| Dilute | N/A | N/A |
| NOTES | Unstable, concentrate viscosity too low | Concentrate too thick |

| | MAP-DAP ratios | | | | | | | | | |
|---|---|---|---|---|---|---|---|---|---|---|
| | 47-53 (C) % | | 47-53 (D) % | | 47-53 (E) % | | 47-53 (F) % | | 89-11 (G) % | |
| | Conc | Dil | Conc | Dil | Conc | Dil | Conc | Dil | Conc | Dil |
| MAP | 23.96 | 4.65 | 23.42 | 4.67 | 24.29 | 4.74 | 24.09 | 4.62 | 45.56 | 8.36 |
| DAP | 27.02 | 5.24 | 26.40 | 5.27 | 27.40 | 5.35 | 27.16 | 5.20 | 5.63 | 1.03 |
| Water | 40.80 | 88.51 | 39.85 | 7.95 | 41.34 | 8.07 | 41.00 | 7.86 | 41.06 | 7.54 |
| Biopolymer | 2.93 | 0.57 | 2.38 | 0.47 | 1.70 | 0.33 | 2.42 | 0.46 | 2.42 | 0.44 |
| Fugitive color | 2.96 | 0.57 | 1.43 | 0.29 | 1.63 | 0.32 | 1.69 | 0.32 | 1.69 | 0.31 |
| Azole corrosion inhibitor | 0.28 | 0.05 | 0.19 | 0.04 | 0.18 | 0.04 | 0.18 | 0.03 | 0.18 | 0.03 |
| Molybdate corrosion inhibitor | 0.22 | 0.04 | 0.10 | 0.02 | 0.10 | 0.02 | 0.10 | 0.02 | 0.10 | 0.02 |

| MAP-DAP ratios | 47-53 (C) | | 47-53 (D) | | 47-53 (E) | | 47-53 (F) | | 89-11 (G) | |
|---|---|---|---|---|---|---|---|---|---|---|
| Flow conditioner | — | | — | | — | | — | | — | |
| Opacifier | 0.28 | 0.05 | 0.13 | 0.03 | 0.15 | 0.03 | 0.15 | 0.03 | 0.15 | 0.03 |
| Defoamer | 0.15 | 0.03 | — | | — | | — | | — | |
| Micronized clay | 1.40 | 0.27 | 6.10 | 1.22 | — | | — | | — | |
| Micronized clay | — | | — | | 3.21 | 0.63 | 3.21 | 0.62 | 3.21 | 0.59 |
| Total | 100.00 | 100.00 | 100.00 | 19.95 | 100.00 | 19.52 | 100.00 | 19.16 | 100.00 | 18.35 |
| | parts water to 1 part concentrate | | parts water to 1 part concentrate | | parts water to 1 part concentrate | | parts water to 1 part concentrate | | parts water to 1 part concentrate | |
| Actual mix ratio used | Did not Dilute | | 5.5 | | 5.5 | | 5.5 | | 5.8 | |
| Mix ratio to reach 10.6% DAP equivalency | 5.54 | | 5.53 | | 5.63 | | 5.45 | | 5.83 | |
| % P$_2$O$_5$ in Dil | 5.64 | | 5.67 | | 5.75 | | 5.60 | | 5.65 | |
| Actual DAP Equivalency | 10.59 | | 10.64 | | 10.80 | | 10.51 | | 10.65 | |
| Total Salt In Conc | 50.98 | | 49.82 | | 51.69 | | 51.25 | | 51.19 | |
| N/P | 1.53 | | 1.53 | | 1.53 | | 1.53 | | 1.11 | |
| Specific Gravity Conc. | | | | | | | | | | |
| S.G (g/ml) | 1.33 | | 1.37 | | 1.33 | | 1.30 | | 1.30 | |
| S.G (lbs/gal) | 11.10 | | 11.41 | | 11.10 | | 10.85 | | 10.85 | |
| Refractive Index Dil | | | | | | | | | | |
| Viscosity (cP) | | | | | | | | | | |
| Concentrate | 60 | | 170 | | 240 | | 757 | | 4126 | |
| Dilute | N/A | | 800 | | 122 | | 767 | | 710 | |
| Notes | Unstable, concentrate viscosity too low | | Kaolinite clay is a white powder, resulting in lighter color concentrate | | Below target viscosity | | Consider decreasing thickener concentrations | | Above target viscosity | |

| | MAP-DAP ratios | | | | | | | |
|---|---|---|---|---|---|---|---|---|
| | 47-53 (H) % | | 47-53 (I) % | | 47-53 (J) % | | 53-47 (K1) % | |
| | Conc | Dil | Conc | Dil | Conc | Dil | Conc | Dil |
| MAP | 24.73 | 4.24 | 23.22 | 4.65 | 23.27 | 4.66 | 26.27 | 5.31 |
| DAP | 24.84 | 4.26 | 26.19 | 5.25 | 26.24 | 5.26 | 23.14 | 4.68 |
| Water | 44.07 | 7.56 | 44.89 | 9.00 | 44.89 | 9.00 | 44.89 | 9.08 |
| Biopolymer | 1.73 | 0.30 | 1.45 | 0.29 | 1.35 | 0.27 | 1.35 | 0.27 |
| Fugitive color | 1.65 | 0.28 | 1.57 | 0.31 | 1.58 | 0.32 | 1.58 | 0.32 |
| Azole corrosion inhibitor | 0.18 | 0.03 | 0.18 | 0.04 | 0.17 | 0.03 | 0.17 | 0.03 |
| Molybdate corrosion inhibitor | 0.10 | 0.02 | 0.10 | 0.02 | 0.10 | 0.02 | 0.10 | 0.02 |

-continued

| | MAP-DAP ratios | | | | | | | |
|---|---|---|---|---|---|---|---|---|
| | 47-53 (H) % | | 47-53 (I) % | | 47-53 (J) % | | 53-47 (K1) % | |
| | Conc | Dil | Conc | Dil | Conc | Dil | Conc | Dil |
| Flow conditioner | — | — | — | — | — | — | — | — |
| Opacifier | 0.15 | 0.03 | 0.15 | 0.03 | 0.15 | 0.03 | 0.15 | 0.03 |
| Defoamer | — | — | — | — | — | — | 0.10 | 0.02 |
| Micronized clay | — | — | — | — | — | — | — | — |
| Micronized clay | 2.55 | 0.44 | 2.25 | 0.45 | 2.25 | 0.45 | 2.25 | 0.46 |
| Total | 100.00 | 17.17 parts water to 1 part concentrate | 100.00 | 20.05 parts water to 1 part concentrate | 100.00 | 20.05 parts water to 1 part concentrate | 100.00 | 20.23 parts water to 1 part concentrate |
| Actual mix ratio used | 6.5 | | 5.2 | | 5.2 | | 5.2 | |
| MAP-DAP ratios | 47-53 (H) | | 47-53 (I) | | 47-53 (J) | | 53-47 (K1) | |
| Mix ratio to reach 10.6% DAP equivalency | 6.5 | | 5.2 | | 5.2 | | 5.3 | |
| % $P_2O_5$ in Dil | 4.87 | | 5.65 | | 5.66 | | 5.75 | |
| Actual DAP Equivalency | 9.15 | | 10.60 | | 10.62 | | 10.79 | |
| Total Salt In Conc | 49.57 | | 49.41 | | 49.51 | | 49.41 | |
| N/P | 1.50 | | 1.53 | | 1.53 | | 1.47 | |
| Specific Gravity Conc. | | | | | | | | |
| S.G (g/ml) | 1.34 | | 1.30 | | 1.30 | | 1.315 | |
| S.G (lbs/gal) | 11.21 | | 10.85 | | 10.85 | | 10.97 | |
| Refractive Index Dil | | | | | 11.00 | | 10.50 | |
| Viscosity (cP) | | | | | | | | |
| Concentrate | 332 | | 180 | | 202 | | 359 | |
| Dilute | 217 | | 225 | | 200 | | 253 | |
| NOTES | Mix ratio was adjusted until target dilute viscosity was met. | | | | See below regarding results of corrosion and viscosity/ stability testing. | | Concentrate made by making a concentrated MAP/DAP Solution and adding powders. K1 and K2 were mixed at 5.2 instead of 5.3 due to the DAP equivalency being 10.63 and 10.59 if the samples were mixed at 5.3. | |

| MAP-DAP ratios | 53-47 (K2) % | | 57-43 (L) % | | 61-39 (M) % | | 65-35 (N) % | | 70-30 (O) % | |
|---|---|---|---|---|---|---|---|---|---|---|
| | Conc | Dil | Conc | Dil | Conc | Dil | Conc | Dil | Conc | Dil |
| MAP | 26.27 | 5.30 | 28.16 | 5.55 | 30.14 | 5.92 | 32.12 | 6.32 | 34.59 | 6.73 |
| DAP | 23.14 | 4.66 | 21.25 | 4.19 | 19.27 | 3.78 | 17.29 | 3.40 | 14.82 | 2.88 |
| Water | 44.89 | 9.05 | 44.89 | 8.85 | 44.89 | 8.81 | 44.89 | 8.84 | 44.89 | 8.74 |
| Biopolymer | 1.35 | 0.27 | 1.35 | 0.27 | 1.35 | 0.26 | 1.35 | 0.27 | 1.35 | 0.26 |

-continued

| MAP-DAP ratios | 53-47 (K2) % | | 57-43 (L) % | | 61-39 (M) % | | 65-35 (N) % | | 70-30 (O) % | |
|---|---|---|---|---|---|---|---|---|---|---|
| | Conc | Dil | Conc | Dil | Conc | Dil | Conc | Dil | Conc | Dil |
| Fugitive color | 1.58 | 0.32 | 1.58 | 0.31 | 1.58 | 0.31 | 1.58 | 0.31 | 1.58 | 0.31 |
| Azole corrosion inhibitor | 0.17 | 0.03 | 0.17 | 0.03 | 0.17 | 0.03 | 0.17 | 0.03 | 0.17 | 0.03 |
| Molybdate corrosion inhibitor | 0.10 | 0.02 | 0.10 | 0.02 | 0.10 | 0.02 | 0.10 | 0.02 | 0.10 | 0.02 |
| Flow conditioner | — | — | — | — | — | — | — | — | — | — |
| Opacifier | 0.15 | 0.03 | 0.15 | 0.03 | 0.15 | 0.03 | 0.15 | 0.03 | 0.15 | 0.03 |
| Defoamer | 0.10 | 0.02 | 0.10 | 0.02 | 0.10 | 0.02 | 0.10 | 0.02 | 0.10 | 0.02 |
| Micronized clay | — | — | — | — | — | — | — | — | — | — |
| Micronized clay | 2.25 | 0.45 | 2.25 | 0.44 | 2.25 | 0.44 | 2.25 | 0.44 | 2.25 | 0.44 |
| Total | 100.00 | 20.16 parts water to 1 part concentrate | 100.00 | 19.72 parts water to 1 part concentrate | 100.00 | 19.63 parts water to 1 part concentrate | 100.00 | 19.69 parts water to 1 part concentrate | 100.00 | 19.46 parts water to 1 part concentrate |
| Actual mix ratio used | 5.2 | | 5.2 | | 5.2 | | 5.2 | | 5.2 | |
| Mix ratio to reach 10.6% DAP equivalency | 5.3 | | 5.2 | | 5.2 | | 5.25 | | 5.2 | |
| % $P_2O_5$ in Dil | 5.73 | | 5.63 | | 5.63 | | 5.68 | | 5.65 | |

| MAP-DAP ratios | 53-47 (K2) | 57-43 (L) | 61-39 (M) | 65-35 (N) | 70-30 (O) |
|---|---|---|---|---|---|
| Actual DAP Equivalency | 10.75 | 10.58 | 10.58 | 10.68 | 10.63 |
| Total Salt In Conc | 49.41 | 49.41 | 49.41 | 49.41 | 49.41 |
| N/P | 1.47 | 1.43 | 1.39 | 1.35 | 1.30 |
| Specific Gravity Conc. | | | | | |
| S.G (g/ml) | 1.309 | 1.274 | 1.266 | 1.271 | 1.253 |
| S.G (lbs/gal) | 10.92 | 10.63 | 10.56 | 10.61 | 10.46 |
| Refractive Index Dil | 10.00 | 9.50 | 9.50 | 9.50 | 9.50 |
| Viscosity (cP) | | | | | |
| Concentrate | 223 | 342 | 405 | 492 | 740 |
| Dilute | 234 | 218 | 146 | 235 | 320 |
| Notes | Concentrates were made by adding all powders (including MAP and DAP) to water. After 24 hours, all concentrates had slight separation (~3%) with a water layer forming at the bottom of the sample jar. Samples were easily remixed by shaking the jars and left undisturbed to monitor separation. All concentrates had particles suspended throughout, appearing to be undissolved MAP or DAP. Generally, as the concentration of MAP increases in the concentrates, more particles are observed. No particles were observed in the dilute solutions. | | | | |

The above results indicate the use of a micronized clay along with MAP and DAP provided favorable compositions in terms of viscosity, storage stability, etc. The use a biopolymer such as xanthan gum, including at particular concentrations, also contributed to compositions that exhibited favorable properties.

Example 6: Initial Corrosion and Viscosity Testing: Composition 47-53 (J)

A diluted sample was subjected to viscosity testing and a concentrate and diluted sample were subjected to corrosion testing. All testing was conducted according to U.S.D.A. Forest Service Specification 5100-304d, (Jan. 7, 2020) after preparation.

| Sample | Storage Condition | | 10 min | 24 hr | 7 day | % Δ 7 d/24 hr | 14 day |
|---|---|---|---|---|---|---|---|
| Dilute | 70° F. | w/Al | 241 | 240 | 240 | 0 | 240 |
| | | w/o | | | 240 | 0 | 240 |
| | 90° F. | w/Al | | | 210 | −13 | 210 |
| | | w/o | | | 240 | 0 | 242 |

| Sample | Storage Condition | | % Δ 14 d/24 hr |
|---|---|---|---|
| Dilute | 70° F. | w/Al | 0 |
| | | w/o | 0 |
| | 90° F. | w/Al | −13 |
| | | w/o | 1 |

| | Sample | Initial Corrosion Rate (Milliinches per year) | | | | | | | | | | | | |
|---|---|---|---|---|---|---|---|---|---|---|---|---|---|---|
| | | 4130 Mild Steel | | | | 2024-T3 Aluminum | | | | A231B- Magnesium | | | | Brass |
| Description | ID | RT/T | RT/P | ET/T | ET/P | RT/T | RT/P | ET/T | ET/P | RT/T | RT/P | ET/T | ET/P | ETP |
| New LC-Corrosion Testing Supply | [B] | 0.4 | 0.2 | 0.5 | 0.3 | 0.9 | 0.5 | 3.9 | 2.9 | 23.0 | 30.6 | 229.0 | 138.6 | 0.2 |
| USFS Requirements Maximum | | | 5.0 | | | | 5.0 | | | | 4.0 | | | 5.0 |
| New LC-Corrosion Testing Supply | B-dil | 0.2 | 0.2 | 0.3 | 0.3 | 0.1 | 0.2 | 0.7 | 0.6 | 0.9 | 0.7 | 1.5 | 1.3 | 0.7 |
| USFS Requirements Maximum | | | 5.0 | | | | 2.0 | | | | 4.0 | | | 5.0 |

RT/T refers to room temperature (70° F./21° C.) (RT) storage and T indicates total submersion of the coupon in solution.

RT/P refers to room temperature (70° F./21° C.) (RT) storage and P indicates total submersion of the coupon in solution.

ET/T refers to elevated temperature (120° F./49° C.) (ET) storage and T indicates total submersion of the coupon in solution.

ET/P refers to elevated temperature (120° F./49° C.) (ET) storage and P indicates total submersion of the coupon in solution.

The results establish diluted solutions prepared from MAP+DAP+micronized clay concentrate formulations satisfy the USFS corrosion standards for mild steel, aluminum, magnesium, and brass under all conditions tested.

The MAP+DAP+micronized clay concentrated formulations satisfy the USFS corrosion standards for mild steel, aluminum and brass under all conditions. The concentrate formulations do not satisfy the magnesium corrosion standards.

Example 7: One Year Viscosity Testing: Composition 47-53 (J)

A concentrate sample of composition 47-53 (J) was tested for viscosity after storage for one year. A diluted sample prepared from a concentrate after storage for one year was also tested for viscosity. The concentrated and diluted samples were tested for initial viscosity and the diluted sample was tested for viscosity after 14 days.

| Concentrate Storage Temp (° F.) | Viscosity (cP) spin#@60 rpm | | Specific Gravity | | pH | | RI Dilute 10440 | RI Conc. Brix |
|---|---|---|---|---|---|---|---|---|
| | Conc. | Dilute | Conc. | Dilute | Conc. | Dilute | | |
| 70° F. w/steel | 120 | 226 | 1.337 | 1.063 | 5.85 | 6.29 | 11.0 | 50.5 |
| 90° F. w/steel | 150 | 222 | 1.337 | 1.063 | 5.85 | 6.35 | 11.0 | 50.5 |

| Concentrate Storage Temp (° F.) | Dilute Storage Temp | 10 min | 24 HR | 7 day | % Δ 7 d/24 hr | 14 day | % Δ 14 d/24 hr |
|---|---|---|---|---|---|---|---|
| 70° F. w/St | 70° F. w/Al | 226 | 220 | 217 | −1 | 219 | 0 |
| | 70° F. w/o Al | | | 221 | 0 | 222 | 1 |
| | 90° F. w/Al | | | 216 | −2 | 219 | 0 |
| | 90° F. w/o Al | | | 225 | 2 | 219 | 0 |
| 90° F. w/St | 70° F. w/Al | 222 | 215 | 216 | 0 | 218 | 1 |
| | 70° F. w/o Al | | | 218 | 1 | 218 | 1 |
| | 90° F. w/Al | | | 209 | −3 | 216 | 0 |
| | 90° F. w/o Al | | | 221 | 3 | 219 | 2 |

These results indicate the MAP+DAP+micronized clay concentrate compositions and diluted solutions prepared therefrom exhibit suitable storage properties (e.g., viscosity and stability).

Embodiments

Embodiment A is a liquid fire retardant concentrate composition, the composition comprising: one or more powdered fire retardants dispersed throughout an aqueous medium, wherein the one or more fire retardants are selected from the group consisting of monoammonium phosphate (MAP), diammonium phosphate (DAP), and ammonium polyphosphate (APP); and a suspending agent comprising micronized clay.

Embodiment A1 is the liquid fire retardant concentrate composition of Embodiment A wherein the one or more fire retardants and MAP and DAP.

Embodiment A2 is the liquid fire retardant concentrate composition of Embodiment A wherein the one or more fire retardants is APP.

Embodiment B is a liquid fire retardant concentrate composition, the composition comprising: a mixture of ammonium phosphates, the mixture comprising monoammonium phosphate (MAP) and diammonium phosphate (DAP); and a suspending agent comprising micronized clay.

Embodiment B1 is the liquid fire retardant concentrate composition of claim B, the composition further comprising water.

Embodiment C is a a liquid fire retardant concentrate composition, the composition comprising: a mixture of ammonium phosphates, the mixture comprising monoammonium phosphate (MAP) and diammonium phosphate (DAP); a suspending agent; and water, wherein water constitutes less than 50% by volume of the concentrate composition.

Embodiment D is a liquid fire retardant concentrate composition, the composition comprising water and a fire retardant component comprising a mixture of ammonium phosphates, wherein: the mixture of ammonium phosphates comprises monoammonium phosphate (MAP) and diammonium phosphate (DAP); and the fire retardant has a sulfate content of less than 0.2% by total weight.

Embodiment D1 is the liquid fire retardant concentrate composition of Embodiment D, the composition further comprising a suspending agent.

Embodiment D2 is the liquid fire retardant concentrate composition of any of the Embodiments C to D1 wherein the suspending agent comprises micronized clay.

Embodiment D3 is the liquid fire retardant concentrate composition of Embodiment D2 wherein the micronized clay is selected from the group consisting of attapulgite clay, kaolinite clay, halloysite clay, and combinations thereof.

Embodiment D4 is the liquid fire retardant concentrate composition of Embodiment D3 wherein the suspending agent comprises attapulgite clay.

Embodiment D5 is the liquid fire retardant concentrate composition of any of Embodiments A to C or D1 to D4 wherein the suspending agent constitutes at least about 1 wt. % of the composition.

Embodiment D6 is the liquid fire retardant concentrate composition of Embodiment D5 wherein the suspending agent constitutes from about 1% to about 7% by weight of the total composition.

Embodiment D7 is the liquid fire retardant concentrate composition of Embodiment D5 wherein the suspending agent constitutes from about 2% to about 3% by weight of the total composition.

Embodiment D8 is the liquid fire retardant concentrate composition of any of the preceding Embodiments, the composition further comprising a biopolymer.

Embodiment D9 is the liquid fire retardant concentrate composition of Embodiment D8 wherein the biopolymer is selected from the group consisting of xanthan gum, rhamsan gum, welan gum, diutan gum, and combinations thereof.

Embodiment D10 is the liquid fire retardant concentrate composition of Embodiment D9, wherein the biopolymer comprises xanthan gum.

Embodiment D11 is the liquid fire retardant concentrate composition of any of Embodiments D8 to D10, wherein the biopolymer constitutes from about 1% to about 5%, from about 1% to about 3%, from about 1% to about 2%, or from about 1% to about 1.5% by weight of the composition.

Embodiment D12 is the liquid fire retardant concentrate composition of any of the preceding Embodiments, wherein water constitutes from about 10% to about 50%, from about 30% to about 50%, or from about 40% to about to about 50% by weight of the total composition.

Embodiment D13 is the liquid fire retardant concentrate composition of any of Embodiments D8 to D12, wherein the composition comprises a suspending agent and a biopolymer at a weight ratio of suspending agent to biopolymer of at least 1:1.

Embodiment D14 is the liquid fire retardant concentrate composition of Embodiment D13 wherein the composition comprises about the suspending agent and biopolymer at a weight ratio of from about 1:1 to about 4:1, from about 1:1 to about 3:1, or from about 1:1 to about 2:1.

Embodiment D15 is the liquid fire retardant concentrate composition of any of the preceding Embodiments wherein the composition further comprises a corrosion inhibitor system.

Embodiment D16 is the liquid fire retardant concentrate composition of Embodiment D15 wherein the corrosion inhibitor system comprises a micronized clay complexed with diammonium phosphate (DAP) and/or monoammonium phosphate (MAP), a molybdate corrosion inhibitor, an azole corrosion inhibitor, a pyrophosphate, or any combination thereof.

Embodiment D17 is the liquid fire retardant concentrate composition of any of Embodiments D15 to D16 wherein the corrosion inhibitor system comprises a molybdate corrosion inhibitor comprising sodium molybdate, potassium molybdate, lithium molybdate, or any combination thereof.

Embodiment D18 is the liquid fire retardant concentrate composition of Embodiment D17 wherein the molybdate corrosion inhibitor comprises sodium molybdate.

Embodiment D19 is the liquid fire retardant concentrate composition of any of Embodiment D15 to D18 wherein the corrosion inhibitor system comprises an azole corrosion inhibitor selected from the group consisting of benzotriazole, tolytriazole and combinations thereof.

Embodiment D20 is the liquid fire retardant concentrate composition of Embodiment D19 wherein the azole corrosion inhibitor comprises tolytriazole.

Embodiment D21 is the liquid fire retardant concentrate composition of any of Embodiments D15 to D20 wherein the corrosion inhibitor comprises a molybdate corrosion inhibitor and an azole corrosion inhibitor.

Embodiment D22 is the liquid fire retardant concentrate composition of Embodiment D21 wherein the molybdate corrosion inhibitor comprises sodium molybdate and the azole corrosion inhibitor comprises tolytriazole.

Embodiment D23 is the liquid fire retardant concentrate composition of any of claims D15 to D22 wherein the corrosion inhibitor system comprises a micronized clay complexed with DAP and/or MAP.

Embodiment E is a liquid fire retardant concentrate composition, the composition comprising: a mixture of ammonium phosphates, wherein the mixture comprises free monoammonium phosphate (MAP) and free diammonium phosphate (free DAP); a corrosion inhibitor system comprising micronized clay complexed with diammonium phosphate (complexed DAP) and/or monoammonium phosphate (complexed MAP); and water.

Embodiment E1 is the liquid fire retardant concentrate composition of Embodiment D23 or Embodiment E wherein the ratio of free DAP to complexed DAP is at least 90:10 and/or the ratio of free MAP to complexed MAP is at least 90:10.

Embodiment E2 is the liquid fire retardant concentrate composition of any of Embodiments D15 to E1 wherein the corrosion inhibitor system constitutes from about 0.02% to about 4% by weight of the composition.

Embodiment E3 is the liquid fire retardant concentrate composition of claim E2 wherein the corrosion inhibitor system comprises constitutes from about 0.02% to about 1% by weight of the composition.

Embodiment E4 is the liquid fire retardant concentrate composition of any of the preceding Embodiments further comprising a pigment or dye.

Embodiment E5 is the liquid fire retardant concentrate composition of Embodiment E4 wherein the pigment or dye comprises red iron oxide, brown iron oxide, or a fugitive pigment or dye.

Embodiment E6 is the liquid fire retardant concentrate composition of Embodiment E5 wherein the fugitive pigment or dye is magenta in color.

Embodiment E7 is the liquid fire retardant concentrate composition of Embodiment E4 wherein the pigment or dye comprises a fugitive color system comprising a fugitive pigment and a water insoluble opaque material.

Embodiment E8 is the liquid fire retardant concentrate composition of Embodiment E7 wherein the water insoluble opaque material comprises ferric oxide, titanium dioxide, zinc ferrite, or any combination thereof.

Embodiment E9 is the liquid fire retardant concentrate composition of Embodiment E8 wherein the water insoluble opaque material comprises ferric oxide.

Embodiment E10 is the liquid concentrate composition of any of Embodiments E7 to E9 wherein the water insoluble opaque material constitutes from about 0.05% to about 4% by weight of the total composition.

Embodiment E11 is the liquid fire retardant concentrate composition of any of Embodiments E6 to E10 wherein the fugitive pigment comprises a fugitive dye encapsulated within a polymeric material and exhibits hydrophilic behavior.

Embodiment E12 is the liquid fire retardant concentrate composition of any of Embodiments E5 to E11 wherein the fugitive pigment is magenta in color.

Embodiment E13 is the liquid fire retardant concentrate composition of any of Embodiments E5 to E12 wherein the fugitive pigment has a Lab color spacing of "L" in a range from about 34 to about 89, "a" in a range from about 18 to about 83, and "b" in a range from about −61 to about 56.

Embodiment E14 is the liquid concentrate composition of any of Embodiments E5 to E13 wherein the fugitive dye or pigment constitutes from about 1% to about 2% by weight of the composition.

Embodiment E15 is the liquid fire retardant concentrate composition of any of the preceding Embodiments wherein the composition further comprises one or more additives selected from the group consisting of a surfactant, a foam controlling additive, a foam former, a biocide and any combination thereof.

Embodiment E16 is the liquid fire retardant concentrate composition of any of the preceding Embodiments wherein the mixture of ammonium phosphates consists essentially of monoammonium phosphate (MAP) and diammonium phosphate (DAP).

Embodiment E17 is the liquid fire retardant concentrate composition of any of the preceding Embodiments wherein the mixture of ammonium phosphates comprises: MAP containing from about 10% to about 12% ammoniacal nitrogen by weight and from about 40% to about 61% phosphorous pentoxide by weight; and DAP containing from about 16% to about 21% ammoniacal nitrogen by weight and from about 40% to about 54% phosphorous pentoxide by weight.

Embodiment E18 is the liquid fire retardant concentrate composition of any of the preceding Embodiments wherein the mixture of ammonium phosphates comprises: MAP containing from about 11% to about 12% ammoniacal nitrogen by weight and from about 55% to about 61% phosphorous pentoxide by weight; and DAP containing from about 16% to about 21% ammoniacal nitrogen by weight and from about 40% to about 54% phosphorous pentoxide by weight.

Embodiment E19 is the liquid fire retardant concentrate composition of any of the preceding Embodiments wherein the ratio of ammoniacal nitrogen to phosphorous (N:P) is about 1.1 to about 1.9.

Embodiment E20 is the liquid fire retardant concentrate composition of any of the preceding Embodiments wherein the ratio of ammoniacal nitrogen to phosphorous (N:P) is about 1.35 to about 1.65.

Embodiment E21 is the liquid fire retardant concentrate composition of any of the preceding Embodiments wherein the ratio of ammoniacal nitrogen to phosphorous (N:P) is in a range from any of about 1.1, 1.2, 1.3, 1.35, 1.4, 1.5, 1.6, or 1.8 to any of about 1.2, 1.3, 1.4, 1.5, 1.6, 1.65, 1.7, 1.8, or 1.9.

Embodiment E22 is the liquid fire retardant concentrate composition of any of the preceding Embodiments wherein the composition comprises from about 19% to about 50% of DAP.

Embodiment E23 is the liquid fire retardant concentrate composition of any of the preceding Embodiments wherein the composition comprises from about 19% to about 47% of DAP.

Embodiment E24 is the liquid fire retardant concentrate composition of any of the preceding Embodiments wherein the composition comprises from about 20% to about 30% of DAP.

Embodiment E25 is the liquid fire retardant concentrate composition of any of the preceding Embodiments wherein the composition comprises from about 25% to about 27% by weight of DAP.

Embodiment E26 is the liquid fire retardant concentrate composition of any of the preceding Embodiments wherein the composition comprises from about 1% to about 30% of MAP.

Embodiment E27 is the liquid fire retardant concentrate composition of any of the preceding Embodiments wherein the composition comprises from about 10% to about 30% of MAP.

Embodiment E28 is the liquid fire retardant concentrate composition of any of the preceding Embodiments wherein the composition comprises from about 20% to about 30% of MAP.

Embodiment E29 is the liquid fire retardant concentrate composition of any of the preceding Embodiments wherein the composition comprises from about 22% to about 24% by weight of MAP.

Embodiment E30 is the liquid fire retardant concentrate composition of any of the preceding Embodiments wherein the composition comprises from about 25% to about 27% by weight of DAP and from about 22% to about 24% by weight of MAP.

Embodiment E31 is the liquid fire retardant concentrate composition of any of the preceding Embodiments wherein the weight ratio of MAP to DAP is in the range of from about 5% to about 60% MAP to about 40% to about 95% DAP of the total ammonium phosphate in the concentrate.

Embodiment E32 is the liquid fire retardant concentrate composition of any of the preceding Embodiments wherein the weight ratio of MAP to DAP is in the range of from about 40% to about 60% MAP to about 40% to about 60% DAP of the total ammonium phosphate in the concentrate.

Embodiment E33 is the liquid fire retardant concentrate composition of any of the preceding Embodiments wherein the weight ratio of MAP to DAP is in the range of from about 45% to about 50% MAP to about 50% to about 55% DAP of the total ammonium phosphate in the concentrate.

Embodiment E34 is the liquid fire retardant concentrate composition of any of the preceding Embodiments wherein the fire retardant component constitutes less than about 75% by weight of the composition.

Embodiment E35 is the liquid fire retardant concentrate composition of any of the preceding Embodiments wherein the fire retardant component constitutes from about 40% to about 60% by weight of the composition.

Embodiment E36 is the liquid fire retardant concentrate composition of any of the preceding Embodiments wherein the liquid concentrate has a density of from about 1.1 to about 1.5.

Embodiment E37 is the liquid fire retardant concentrate composition of any of the preceding Embodiments wherein the liquid concentrate exhibits a viscosity of from about 100 cP to about 300 cP.

Embodiment E38 is the liquid fire retardant concentrate composition of any of the preceding Embodiments wherein the pH of the liquid concentrate is from about 5 to 6.

Embodiment F is liquid fire retardant concentrate composition comprising a mixture of ammonium phosphates comprising monoammonium phosphate and diammonium phosphate, water, and a suspending agent comprising micronized clay wherein: the diammonium phosphate constitutes from about 19% to about 48% by weight of the total composition; the monoammonium phosphate constitutes from about 2% to about 30% by weight of the total composition; the suspending agent constitutes from about 1% to about 7% by weight of the total composition; and water constitutes from about 10% to about 50% by weight of the total composition.

Embodiment F1 is the liquid fire retardant concentrate composition of Embodiment F wherein: the diammonium phosphate constitutes from about 26% to about 27% by weight of the total composition; the monoammonium phosphate constitutes from about 23% to about 24% by weight of the total composition; the suspending agent constitutes from about 2% to about 3% by weight of the total composition; and water constitutes from about 40% to about 50% by weight of the total composition.

Embodiment F2 is the liquid fire retardant concentrate composition of Embodiment F or F1 wherein the composition further comprises a biopolymer, a pigment or dye, and a corrosion inhibitor system, wherein the biopolymer constitutes from about 1% to about 2% by weight of the total composition.

Embodiment F3 is the liquid fire retardant concentrate composition of Embodiment F2 wherein: (a) the pigment or dye comprises a fugitive pigment and an opacifier, and the fugitive pigment constitutes from about 1.0% to about 2.0% by weight of the total composition and the opacifier constitutes from about 0.10% to about 0.20% by weight of the total composition; and (b) the corrosion inhibitor system comprises a molybdate corrosion inhibitor and an azole corrosion inhibitor and the molybdate corrosion inhibitor constitutes from about 0.05 to about 0.15% by weight of the total composition and the azole corrosion inhibitor constitutes from about 0.10% to about 0.20% by weight of the total composition.

Embodiment F4 is the liquid fire retardant concentrate composition of Embodiment F3, the composition comprising about 26.24% by weight of diammonium phosphate, about 23.27% by weight of the monoammonium phosphate, about 44.89% by weight of the water, about 1.35% by weight of the biopolymer, about 2.25% by weight of the micronized clay, about 1.58% by weight of the fugitive pigment, about 0.15% by weight of the opacifier, about 0.17% by weight of the azole corrosion inhibitor and about 0.10% by weight of the molybdate corrosion inhibitor, based on the total weight of the composition.

Embodiment G is a fire retardant solution prepared by the method of mixing the liquid fire retardant concentrate composition of any one of the preceding Embodiments with water.

Embodiment G1 is the fire retardant solution of Embodiment G wherein the liquid concentrate is mixed with water at a ratio of from about 3 parts water to 1 part liquid concentrate to about 7 parts water to about 1 part of liquid concentrate.

Embodiment G2 is the fire retardant solution of Embodiment G or G1 wherein the liquid concentrate is mixed with water at a ratio of from about 4 parts water to 1 part liquid concentrate to about 6 parts water to 1 part liquid concentrate.

Embodiment G3 is the fire retardant solution of any of Embodiments G to G2 wherein the fire retardant solution exhibits a viscosity in the range of from about 100 cPs to about 1500 cPs, from about 100 cPs to about 1000 cPs, or from about 100 cPs to about 800 cPs.

Embodiment G4 is the fire retardant solution of any of Embodiments G to G3 wherein the solution exhibits a magnesium alloy corrosion rate equal to or less than 2.0 milli-inches per year.

Embodiment G5 is the fire retardant solution of any of Embodiments G to G4 wherein the solution meets all of the required corrosion criteria of U.S. Department of Agriculture, Forest Service, Specification Number 5100-304d, January 2020, including all amendments.

Embodiment G6 is the fire retardant solution of any of Embodiments G to G5 wherein the solution meets all of the required stability_criteria of U.S Department of Agriculture, Forest Service, Specification Number 5100-304d, January 2020, including all amendments.

Embodiment G7 is the fire retardant solution of any of Embodiments G to G6 wherein the solution meets all of the required corrosion and stability_criteria of U.S Department of Agriculture, Forest Service, Specification Number 5100-304d, January 2020, including all amendments.

Embodiment G8 is the fire retardant solution of any of Embodiments G to G7 wherein the solution exhibits an aquatic toxicity ($LC_{50}$) in the range of from about 180 milligrams per liter to about 2700 milligrams per liter, or in the range of from about 750 milligrams per liter to about 1000 milligrams per liter.

Embodiment G9 is the fire retardant solution of any of Embodiments G to G8 wherein the solution exhibits an aquatic toxicity ($LC_{50}$) greater than 180 milligrams per liter.

Embodiment G10 is the fire retardant solution of any of Embodiments G to G9 wherein the solution has an acidic pH.

Embodiment G11 is the fire retardant solution of any of Embodiments G to G10 wherein the solution has a pH of about 6 to 7.

Embodiment H is a method of producing a liquid fire retardant concentrate, the method comprising: adding monoammonium phosphate (MAP) and diammonium phosphate (DAP) to an aqueous medium, and adding a suspending agent comprising micronized clay to the aqueous medium containing the MAP and DAP.

Embodiment H1 is the method of Embodiment H wherein the method further comprises adding a biopolymer comprising xanthan gum to the aqueous medium containing the MAP and DAP.

Embodiment H2 is the method of Embodiment H wherein the fire retardant liquid concentrate produced is the fire retardant liquid concentrate of any one of Embodiment A to Embodiment F4.

Embodiment I is a method of producing a fire retardant solution, the method comprising: mixing a liquid fire retardant concentrate composition and water, the composition comprising water, micronized clay, and a mixture of ammonium phosphates, the mixture of ammonium phosphates comprising MAP and DAP; wherein: said mixing involves combining at least five volumes of water per volume of concentrate.

Embodiment I1 is the method of producing a fire retardant solution of Embodiment I wherein the ratio of water to liquid concentrate is from about 5:1 to about 7:1.

Embodiment I2 is the method of producing a fire retardant solution of Embodiment I or Embodiment I1 wherein the fire retardant solution produced is the fire retardant solution of any one of claims Embodiment G to Embodiment G11.

Embodiment J is a method of combatting a wildfire, the method comprising applying the fire retardant solution of any of Embodiments G to G11 either directly onto flaming fuel or indirectly onto the fuel ahead of a potentially advancing fire front.

Embodiment J1 is the method of combatting a wildfire of Embodiment J wherein the fire retardant solution is applied from a ground platform, an aerial platform, or from both.

Embodiment J2 is the method of combatting a wildfire of Embodiment J wherein the fire retardant solution is applied from a rotary wing aircraft.

Embodiment J3 is the method of combatting a wildfire of claim J1 or J2 wherein the fire retardant solution is applied from a device consisting of a helicopter bucket, an internal tank, or a tank directly attached to the exterior of the delivery platform.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description shall be interpreted as illustrative and not in a limiting sense.

APPENDIX A

| Royale Pigments & Chemicals Magenta 108 PB | | |
|---|---|---|
| Chemical name | Common name and synonyms | CAS # |
| COMPOSITION | | |
| Isophorone diamine | 3-Aminomethyl-3,5,5-trimethyl Cyclohexylamine IPD | 2855-13-2 |
| Petroleum resins | | 64742-16-1 |
| 1,3-Benzenedicarboxylic acid | Isophthalic acid | 121-91-5 |
| Benzoic acid | Benzenecarboxylic acid | 65-85-0 |
| 1,3,5 -Triazine-2,4,6-triamine | Melamine | 108-78-1 |
| Isobutanolamine | 2-Amino-2-methyl-1-propanol | 124-68-5 |
| Calcium carbonate | Aragonite Calcium monocarbonate | 471-34-1 |
| Polyphosphoric acids, ammonium salts | Ammonium polyphosphate | 68333-79-9 |
| Xanthylium, 3,6-bis(ethylamino)-9-[2-(methoxycarbonyl)phenyl]-2,7-dimethyl-,chloride | CI Basic Red 1:1 | 3068-39-1 |
| Xanthylium,3,6-bis(diethylamino)-9-[2-(methoxycarbonyl)phenyl]-,(T-4)-tetrachlorozincate(2−) (2:1) | CI Basic Violet 11:1 | 73398-89-7 |
| 2-Naphthalenol, 1-[(2-methoxyphenyl)azo]- | CI Solvent Red 1 | 1229-55-6 |

APPENDIX A-continued

Royale Pigments & Chemicals Magenta 108 PB

| Chemical name | Common name and synonyms | CAS # |
|---|---|---|
| PHYSICAL AND CHEMICAL PROPERTIES | | |
| pH | 6.5-7.5 | |
| Melting/Freezing Point | 165° C.-175° C. | |
| Bulk Density (gms/cc) | 0.25-0.35 | |
| Particle size in Microns | D50 | 3-4 |
| (Wet method - by | D90 | 8-10 |
| Malvern Mastersizer 3000) | D100 | 14-18 |

What is claimed is:

1. A liquid fire retardant concentrate composition, the composition comprising:
   one or more powdered fire retardants dispersed throughout an aqueous medium, wherein the one or more fire retardants are selected from the group consisting of monoammonium phosphate (MAP), diammonium phosphate (DAP), and ammonium polyphosphate (APP);
   a suspending agent comprising micronized clay, and
   a corrosion inhibitor system comprising a molybdate corrosion inhibitor and an azole corrosion inhibitor.

2. The liquid fire retardant concentrate composition of claim 1 wherein the one or more fire retardants are MAP and DAP.

3. The liquid fire retardant concentrate composition of claim 2 wherein the composition comprises MAP and DAP in a weight ratio of from about 40:60 to about 60:40.

4. The liquid fire retardant concentrate composition of claim 1 wherein the one or more fire retardants is APP.

5. The liquid fire retardant concentrate composition of claim 4 wherein the composition comprises from about 10% to about 50% APP.

6. The liquid fire retardant concentrate composition of claim 1 wherein the suspending agent comprises a micronized clay selected from the group consisting of attapulgite clay, kaolinite clay, halloysite clay, bentonite clay, and combinations thereof in an amount of from about 2% to about 5% by weight of the composition.

7. The liquid fire retardant concentrate composition of claim 1 wherein the corrosion inhibitor comprises anhydrous sodium molybdate, its dihydrate, or a mixture thereof in an amount of from about 0.01% to about 2.0% by weight of the composition.

8. The liquid fire retardant concentrate composition of claim 1 wherein the azole corrosion inhibitor comprises tolytriazole and/or benzotriazole in an amount of from about 0.01% to about 2.0% by weight of the composition.

9. The liquid fire retardant concentrate composition of claim 1 wherein the concentrate composition further comprises water, wherein water constitutes from about 10% to about 50% by weight of the concentrate composition.

10. A liquid fire retardant concentrate composition, the composition comprising:
    water;
    a mixture of ammonium phosphates, the mixture comprising monoammonium phosphate (MAP) and diammonium phosphate (DAP);
    a suspending agent comprising micronized clay; and
    a corrosion inhibitor system comprising a molybdate corrosion inhibitor and an azole corrosion inhibitor, wherein:
    water constitutes less than 50% by volume of the concentrate composition.

11. The liquid fire retardant concentrate composition of claim 10, wherein water constitutes from about 10% to about 50% by weight of the concentrate composition.

12. The liquid fire retardant concentrate composition of claim 11 wherein:
    the diammonium phosphate constitutes from about 19% to about 48% by weight of the total composition;
    the monoammonium phosphate constitutes from about 2% to about 30% by weight of the total composition; and
    the suspending agent constitutes from about 1% to about 7% by weight of the total composition.

13. The liquid fire retardant concentrate composition of claim 10 wherein:
    the mixture of ammonium phosphates comprises free monoammonium phosphate (MAP) and free diammonium phosphate (free DAP);
    the micronized clay is complexed with diammonium phosphate (complexed DAP) and/or monoammonium phosphate (complexed MAP); and
    water constitutes from about 10% to about 50% by weight of the concentrate composition.

14. The liquid fire retardant concentrate composition of claim 10 wherein the composition comprises MAP and DAP in a weight ratio of from about 40:60 to about 60:40.

15. The liquid fire retardant concentrate composition of claim 10 wherein the suspending agent comprises a micronized clay selected from the group consisting of attapulgite clay, kaolinite clay, halloysite clay, bentonite clay, and combinations thereof in an amount of from about 2% to about 5% by weight of the composition.

16. The liquid fire retardant concentrate composition of claim 10 wherein the corrosion inhibitor comprises anhydrous sodium molybdate, its dihydrate, or a mixture thereof in an amount of from about 0.01% to about 2.0% by weight of the composition and the azole corrosion inhibitor comprises tolytriazole and/or benzotriazole in an amount of from about 0.01% to about 2.0% by weight of the composition.

17. A liquid fire retardant concentrate composition, the composition comprising:
    a mixture of ammonium phosphates, the mixture comprising monoammonium phosphate (MAP) and diammonium phosphate (DAP);
    a suspending agent comprising micronized clay;
    water, wherein water constitutes from about 10% to about 50% by weight of the concentrate composition; and
    a corrosion inhibitor system comprising a molybdate corrosion inhibitor and an azole corrosion inhibitor.

18. The liquid fire retardant concentrate composition of claim 17 wherein the composition comprises MAP and DAP in a weight ratio of from about 40:60 to about 60:40.

19. The liquid fire retardant concentrate composition of claim 17 wherein the suspending agent comprises a micronized clay selected from the group consisting of attapulgite clay, kaolinite clay, halloysite clay, bentonite clay, and combinations thereof in an amount of from about 2% to about 5% by weight of the composition.

20. The liquid fire retardant concentrate composition of claim 17 wherein the corrosion inhibitor comprises anhydrous sodium molybdate, its dihydrate, or a mixture thereof in an amount of from about 0.01% to about 2.0% by weight of the composition.

21. The liquid fire retardant concentrate composition of claim 17 wherein the azole corrosion inhibitor comprises tolytriazole and/or benzotriazole in an amount of from about 0.01% to about 2.0% by weight of the composition.

22. The liquid fire retardant concentrate composition of claim 17 wherein the composition further comprises a biopolymer selected from the group consisting of xanthan gum, rhamsan gum, welan gum, diutan gum, and mixtures thereof.

23. The liquid fire retardant concentrate composition of claim 22 wherein the weight ratio of micronized clay to biopolymer is from about 1:1 to about 3:1.

24. The liquid fire retardant concentrate composition of claim 17 wherein water constitutes from about 40% to about 50% by weight of the composition.

25. The liquid fire retardant concentrate composition of claim 17 wherein the composition further comprises a pigment or dye.

26. The liquid fire retardant concentrate composition of claim 25 wherein the composition comprises a fugitive color system.

27. The liquid fire retardant concentrate composition of claim 17 further comprising an opacifier selected from the group consisting of ferric oxide, titanium dioxide, zine ferrite, combinations thereof.

28. A liquid fire retardant concentrate composition, the composition comprising water and a fire retardant component comprising a mixture of ammonium phosphates, wherein:
   the mixture of ammonium phosphates comprises monoammonium phosphate (MAP) and diammonium phosphate (DAP);
   the fire retardant component has a sulfate content of less than 0.2% by total weight);
   the composition comprises a suspending agent comprising micronized clay; and
   a corrosion inhibitor system comprising a molybdate corrosion inhibitor and an azole corrosion inhibitor.

29. The liquid fire retardant concentrate composition of claim 28 wherein the micronized clay is selected from the group consisting of attapulgite clay, kaolinite clay, halloysite clay, bentonite clay, and combinations thereof.

30. The liquid fire retardant concentrate composition of claim 28, the composition further comprising a biopolymer.

31. The liquid fire retardant concentrate composition of claim 30 wherein the biopolymer is selected from the group consisting of xanthan gum, rhamsan gum, welan gum, diutan gum, and combinations thereof.

32. The liquid fire retardant concentrate composition of claim 28, wherein water constitutes from about 10% to about 50% by weight of the total composition.

33. The liquid fire retardant concentrate composition of claim 32, wherein the composition comprises a suspending agent and a biopolymer at a weight ratio of suspending agent to biopolymer of at least 1:1.

34. The liquid fire retardant concentrate composition of claim 28 wherein the corrosion inhibitor system constitutes from about 0.01% to about to about 2.0% by weight.

35. The liquid fire retardant concentrate composition of claim 34 wherein the corrosion inhibitor system comprises a micronized clay complexed with diammonium phosphate (DAP) and/or monoammonium phosphate (MAP), a molybdate corrosion inhibitor, an azole corrosion inhibitor, a pyrophosphate, or any combination thereof.

36. A fire retardant solution prepared by the method of mixing the liquid fire retardant concentrate composition of claim 28 with water.

37. A method of combatting a wildfire, the method comprising applying the fire retardant solution of claim 36 either directly onto flaming fuel or indirectly onto the fuel ahead of a potentially advancing fire front.

* * * * *